(12) United States Patent
Anderson et al.

(10) Patent No.: US 9,694,310 B2
(45) Date of Patent: Jul. 4, 2017

(54) FUEL VAPOR RECOVERY CANISTER

(71) Applicant: Stant USA Corp., Connersville, IN (US)

(72) Inventors: John Brian Anderson, Liberty, IN (US); Matthew F Bischoff, Brookville, IN (US); John C Long, II, Auburn Hills, MI (US); Michael S Brock, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 14/822,348

(22) Filed: Aug. 10, 2015

(65) Prior Publication Data

US 2016/0038870 A1    Feb. 11, 2016

Related U.S. Application Data

(60) Provisional application No. 62/035,935, filed on Aug. 11, 2014, provisional application No. 62/189,923, filed on Jul. 8, 2015.

(51) Int. Cl.
*F02M 25/08* (2006.01)
*B01D 53/04* (2006.01)

(52) U.S. Cl.
CPC ..... *B01D 53/0446* (2013.01); *B01D 53/0415* (2013.01); *F02M 25/0854* (2013.01); *B01D 2253/102* (2013.01); *B01D 2257/702* (2013.01); *B01D 2259/402* (2013.01); *B01D 2259/40003* (2013.01); *B01D 2259/4516* (2013.01)

(58) Field of Classification Search
CPC ............ B01D 53/0415; B01D 53/0446; B01D 2253/102; B01D 2257/702; B01D 2259/40003; B01D 2259/402; B01D 2259/4516; F02M 25/08; F02M 25/0854
USPC ............ 95/146; 96/121, 130, 131, 143, 144; 123/518, 519
See application file for complete search history.

(56) References Cited

U.S. PATENT DOCUMENTS

| | | | |
|---|---|---|---|
| 5,564,398 A | 10/1996 | Maeda et al. | |
| 5,875,765 A | 3/1999 | Norton | |
| 6,176,259 B1 | 1/2001 | Harde et al. | |
| 7,228,850 B2 | 6/2007 | King | |
| 7,527,044 B2 | 5/2009 | Dunkle et al. | |
| 7,900,607 B2 | 3/2011 | Lang et al. | |
| 7,981,199 B2 | 7/2011 | Burk et al. | |
| 8,015,965 B2 | 9/2011 | Yamasaki | |
| 8,099,999 B2 | 1/2012 | Nakano | |

(Continued)

FOREIGN PATENT DOCUMENTS

| | | |
|---|---|---|
| CN | 101239582 B | 8/2010 |
| DE | 102008029079 A1 | 12/2009 |

(Continued)

OTHER PUBLICATIONS

PCT International Search Report and Written Opinion completed by the ISA/US on Oct. 5, 2015 and issued in connection with PCT/US2015/044592.

*Primary Examiner* — Frank Lawrence
(74) *Attorney, Agent, or Firm* — Barnes & Thornburg LLP

(57) ABSTRACT

A vehicle fuel system includes a vapor recovery canister containing at least two carbon beds. Each carbon bed is configured to capture hydrocarbon material associated with fuel vapor discharged from a vehicle fuel tank into the canister.

21 Claims, 21 Drawing Sheets

(56) References Cited

U.S. PATENT DOCUMENTS

| | | |
|---|---|---|
| 8,157,904 B2 | 4/2012 | Ammermann et al. |
| 8,215,290 B2 | 7/2012 | Dunkle et al. |
| 8,230,842 B2 | 7/2012 | Hoag |
| 8,297,262 B2 | 10/2012 | Lang et al. |
| 8,328,916 B2 | 12/2012 | Donadei et al. |
| 8,360,034 B2 | 1/2013 | Yamasaki |
| 8,375,925 B2 | 2/2013 | Ichikawa et al. |
| 8,440,005 B2 | 5/2013 | Lang et al. |
| 8,443,786 B2 | 5/2013 | Yamasaki |
| 8,512,453 B2 | 8/2013 | Rudolph et al. |
| 8,685,152 B2 | 4/2014 | Eschlbeck et al. |
| 2002/0124836 A1* | 9/2002 | Reddy ................ F02M 25/08 123/518 |
| 2004/0173190 A1* | 9/2004 | Makino ................ F02D 41/004 123/520 |
| 2009/0013945 A1 | 1/2009 | Buckland et al. |
| 2009/0101119 A1 | 4/2009 | Ammermann |
| 2009/0293726 A1 | 12/2009 | Ammermann et al. |
| 2010/0313763 A1 | 12/2010 | Lang et al. |
| 2011/0315126 A1 | 12/2011 | Yoshida et al. |
| 2013/0263741 A1* | 10/2013 | Mani ................ F02M 25/0854 96/112 |
| 2013/0319379 A1 | 12/2013 | Hettinger et al. |
| 2014/0041522 A1 | 2/2014 | Yoshida et al. |
| 2014/0230796 A1* | 8/2014 | Brock ................ F02M 25/0854 123/520 |

FOREIGN PATENT DOCUMENTS

| | | |
|---|---|---|
| EP | 2171248 B1 | 3/2015 |
| EP | 2728157 A4 | 4/2015 |

\* cited by examiner

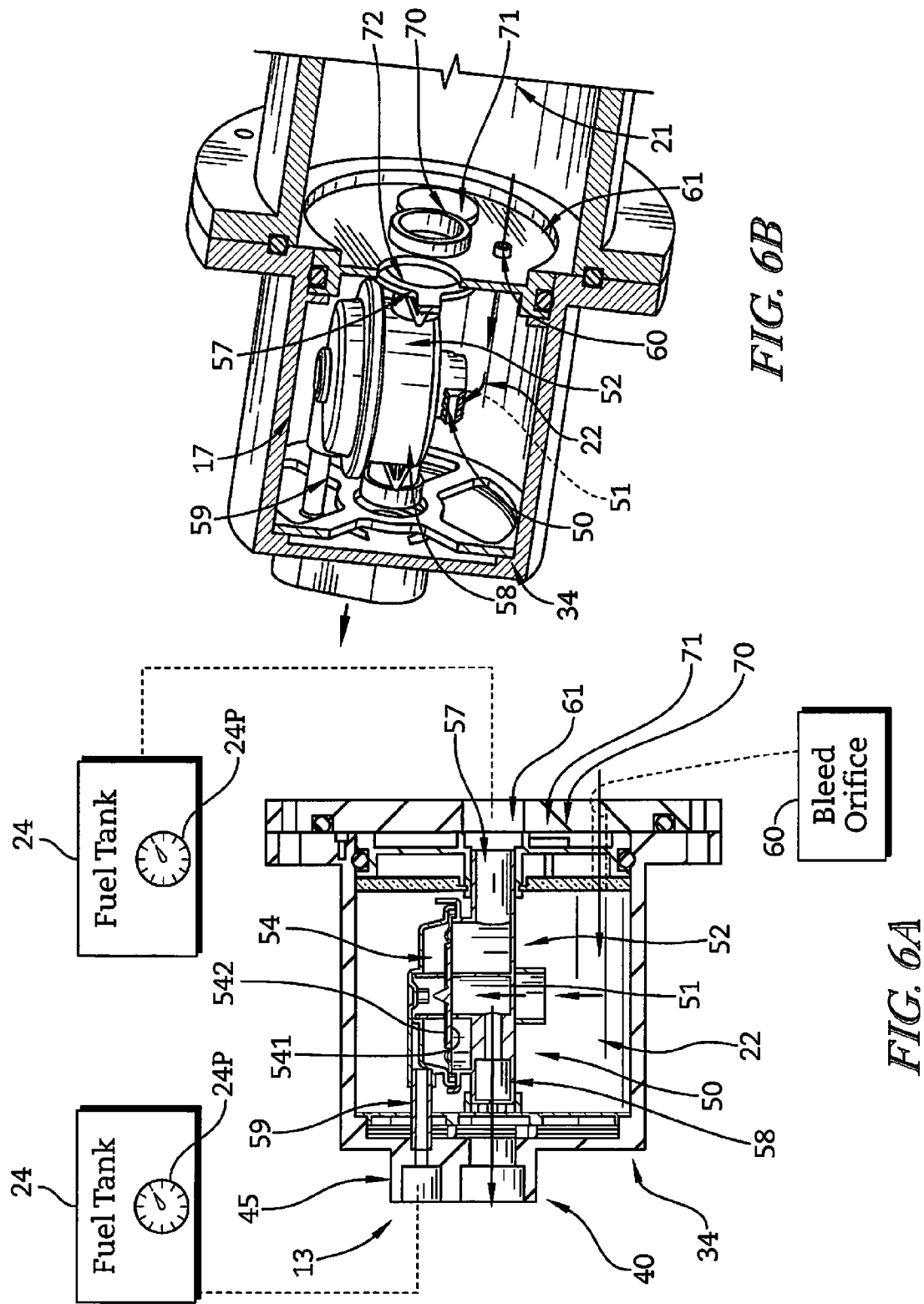

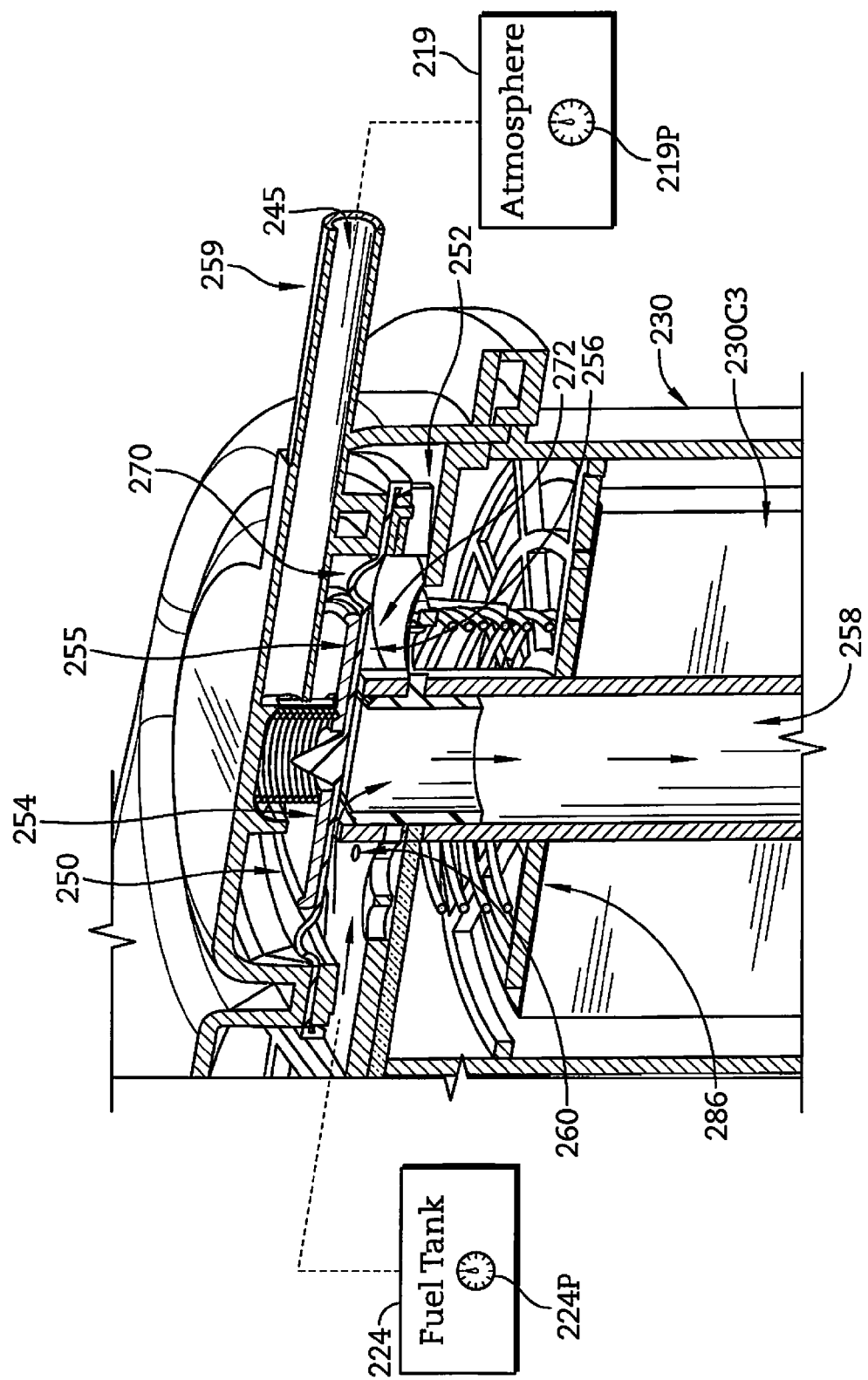

FUEL VAPOR RECOVERY CANISTER

PRIORITY CLAIM

This application claims priority under 35 U.S.C. §119(e) to U.S. Provisional Application Ser. No. 62/035,935, filed Aug. 11, 2014, and to U.S. Provisional Application Ser. No. 62/189,923, filed Jul. 8, 2015, which are both expressly incorporated by reference herein.

BACKGROUND

The present disclosure relates to a vehicle fuel system, and particularly to a fuel vapor venting system associated with a vehicle fuel tank. More particularly, the present disclosure relates to a fuel vapor recovery canister included in a fuel vapor venting system.

Vehicle fuel systems are configured to vent pressurized or displaced fuel vapor from the vapor space in the fuel tank to a separate charcoal canister. The canister is designed to capture and store hydrocarbons entrained in fuel vapors that are displaced and generated in the fuel tank and then discharge filtered air from the canister to the atmosphere. More specifically, during venting, hydrocarbons carried in the fuel vapor are stored (e.g., adsorbed) on charcoal held in the canister.

Fuel vapor is vented from the fuel tank into the canister during fuel tank refueling when a vehicle engine is off as the incoming fuel displaces fuel vapor within the fuel tank. In addition, fuel vapor is frequently vented from the fuel tank during normal operation of the vehicle fuel system as a consequence of daily rising atmospheric temperatures around the fuel tank that cause expansion of fuel and fuel vapor stored in the fuel tank.

A purge vacuum is applied to the canister when the vehicle engine is running via an engine intake manifold coupled to the canister. Hydrocarbons stored on charcoal held in the canister are entrained in a stream of atmospheric air drawn into the canister by the purge vacuum. This produces a stream of fuel vapor laden with reclaimed hydrocarbon material that is discharged through a purge hose into the intake manifold for combustion in the engine.

SUMMARY

A canister system in accordance with the present disclosure includes charcoal contained in a filter bed housing. The filter bed housing includes an inlet adapted to be coupled to a tank vent control system coupled to a fuel tank and to an intake manifold coupled to a vehicle engine. The filter bed housing also includes an outlet adapted to communicate with atmospheric air located outside of the canister.

In illustrative embodiments, the canister system includes first and second carbon beds located in spaced-apart relation to one another inside the filter bed housing that capture hydrocarbons vented from the fuel tank and a vapor flow controller adapted to control the movement of fuel vapor through the canister system. The vapor flow controller illustratively comprises a bypass valve adapted to open and allow fuel vapor to pass along a first flow path from the first carbon bed to the atmosphere during refueling without passing through the second carbon bed. By allowing the movement of fuel vapor directly to atmosphere without interaction with the second carbon bed during refueling, the second carbon bed remains substantially clean for use during normal operation of the fuel system. During normal operation, the bypass valve is adapted to close and block fuel vapor from passing from the first carbon bed to the atmosphere so that any fuel vapor discharged into the canister must pass along a second flow path through both the first carbon bed and the second carbon bed before being discharged into the atmosphere.

In illustrative embodiments, the bypass valve moves from being normally closed to open when (1) a fuel tank closure is opened by a user removing a fuel cap and (2) pressure in the fuel tank is above atmospheric pressure. The bypass valve includes an outlet tube, a flexible diaphragm, and a spring. The outlet tube provides a passageway for fuel vapor flowing from the first carbon bed toward the second carbon bed to bypass the second carbon bed and flow directly to atmosphere. A first side of the flexible diaphragm is exposed to pressure from the fuel tank and normally engages the outlet tube to block fuel vapor from moving into the outlet tube and bypassing the second carbon bed. A second side of the flexible diaphragm, opposite the first side, is exposed to pressure from the fuel tank when the fuel tank closure is closed and is exposed to atmospheric pressure when the fuel tank closure is opened by a user removing the fuel cap. If fuel tank pressure is greater than atmospheric pressure when the fuel tank closure is opened, as is typical during refueling, the flexible diaphragm bends out of engagement with the outlet tube to allow fuel vapor to move into the outlet tube and bypass the second carbon bed. The spring applies a small force that resists movement of the flexible diaphragm out of engagement with the outlet tube to bias the bypass valve toward the closed position.

In illustrative embodiments, the vapor flow controller also includes a bleed orifice providing a vapor flow passageway interconnecting the carbon beds and a one-way check valve that allows flow along a third flow path from the second carbon bed to the first carbon bed during purge of the canister. The bleed orifice extends through a wall separating the first carbon bed from the second carbon bed and conducts fuel vapor from the first carbon bed to the second carbon bed during normal operation. The one-way check valve allows atmospheric air drawn into the canister to pass from the second carbon bed to the first carbon bed during purging of the canister when atmospheric air is drawn through the canister by a vacuum created in the intake manifold while the engine is running to remove hydrocarbons from the first and second carbon beds and discharge them into the engine where they are burned.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a partially diagrammatic view of a vehicle fuel system including a sectional view of a canister system in accordance with the present disclosure and showing that the canister system includes first and second carbon beds along with a vapor flow controller and showing that the first carbon bed is located near a canister inlet coupled to a tank vent control system and to an engine intake manifold and that the second carbon bed is located near an opposite canister outlet coupled to the atmosphere;

Figure 1:
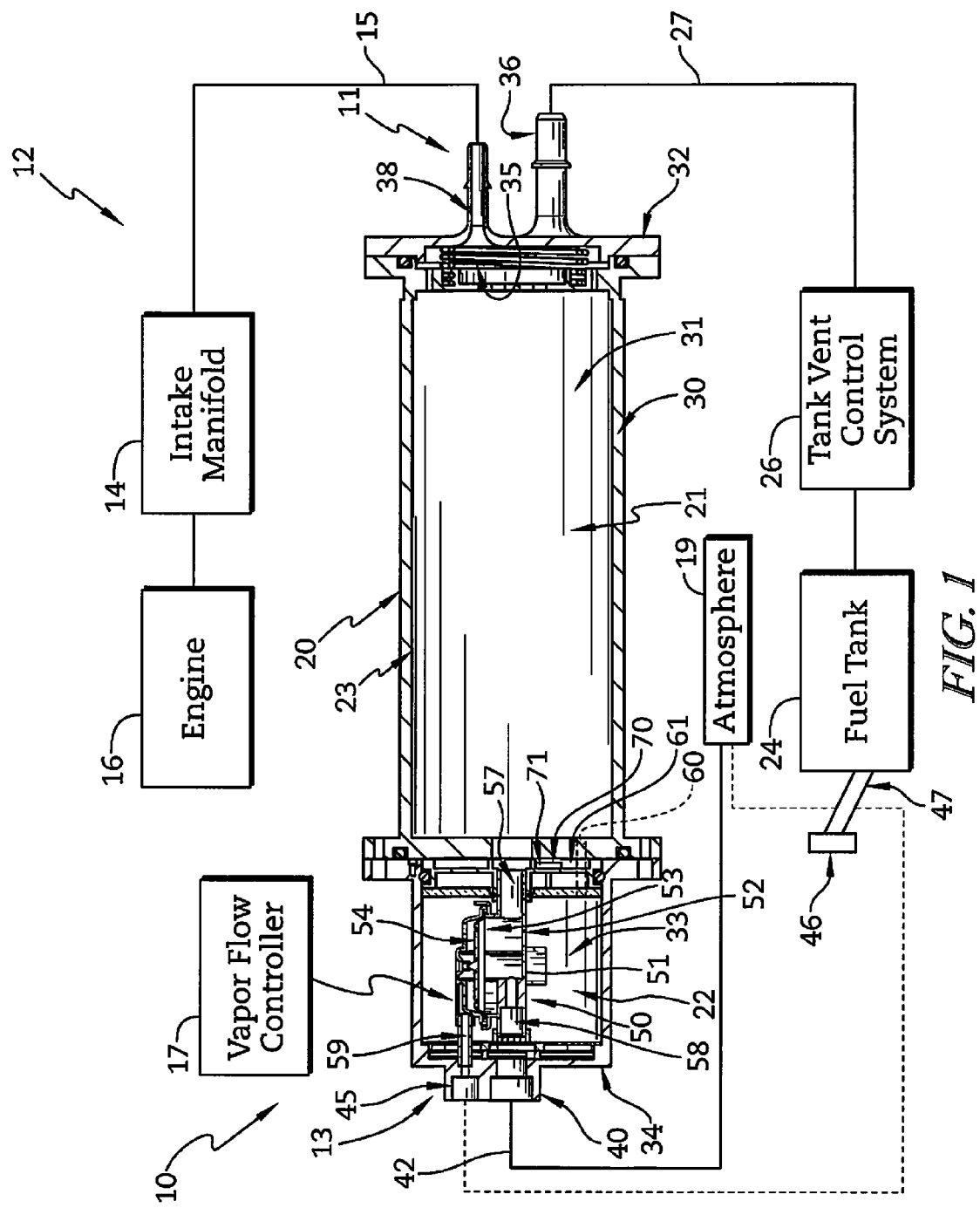
FIG. 1A is an exploded perspective view of the canister system included in the vehicle fuel system of FIG. 1.
FIG. 1B is a detail view of a portion of FIG. 1A showing that the vapor flow controller includes a bypass valve having a flexible diaphragm, a bleed orifice formed in a wall separating the first carbon bed from the second carbon bed, and a one-way check valve provided by a plurality of umbrella valves mounted in the wall separating the first carbon bed from the second carbon bed.
Figure 2:
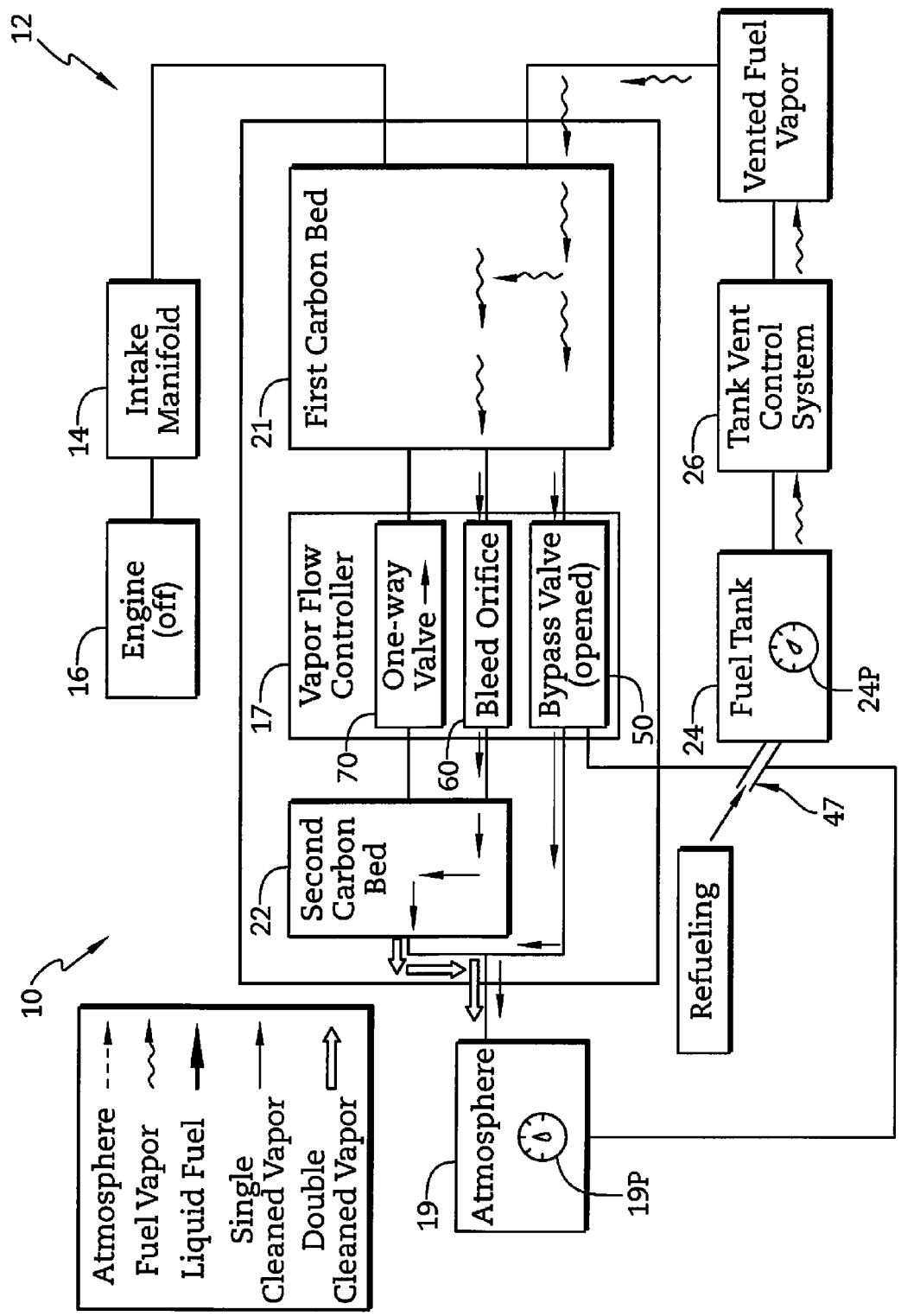
Figure 3:
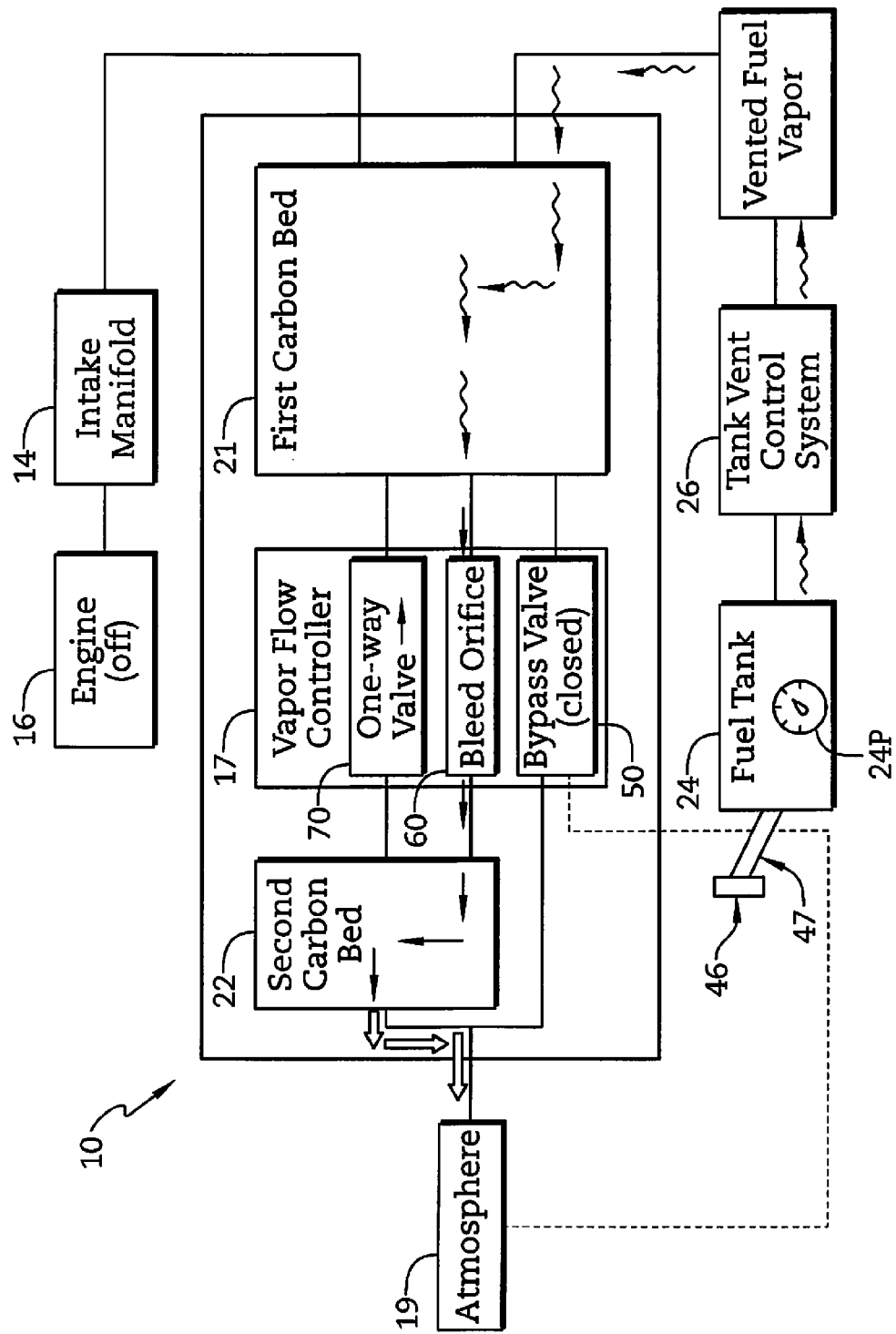
Figure 4:
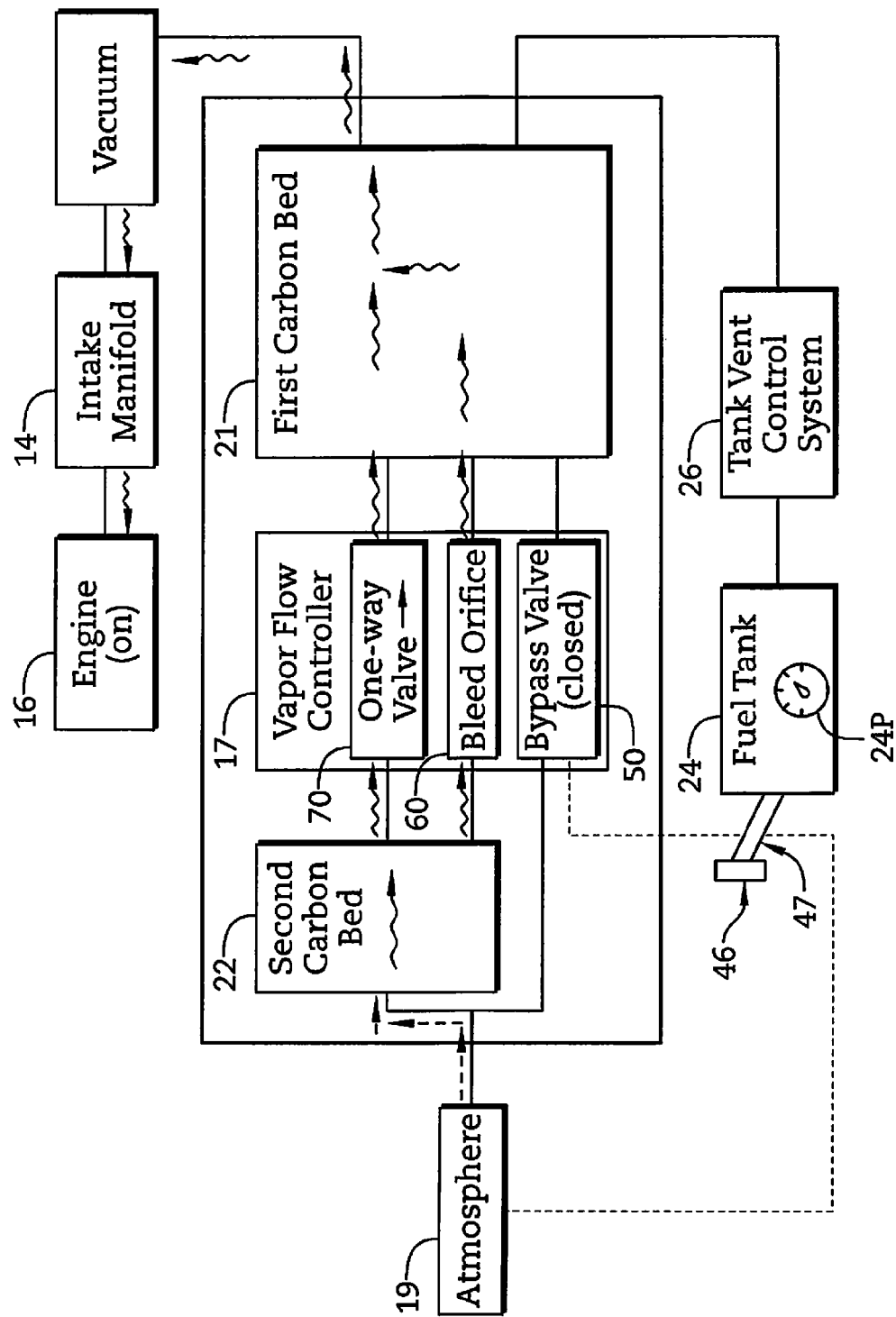
Figure 5:
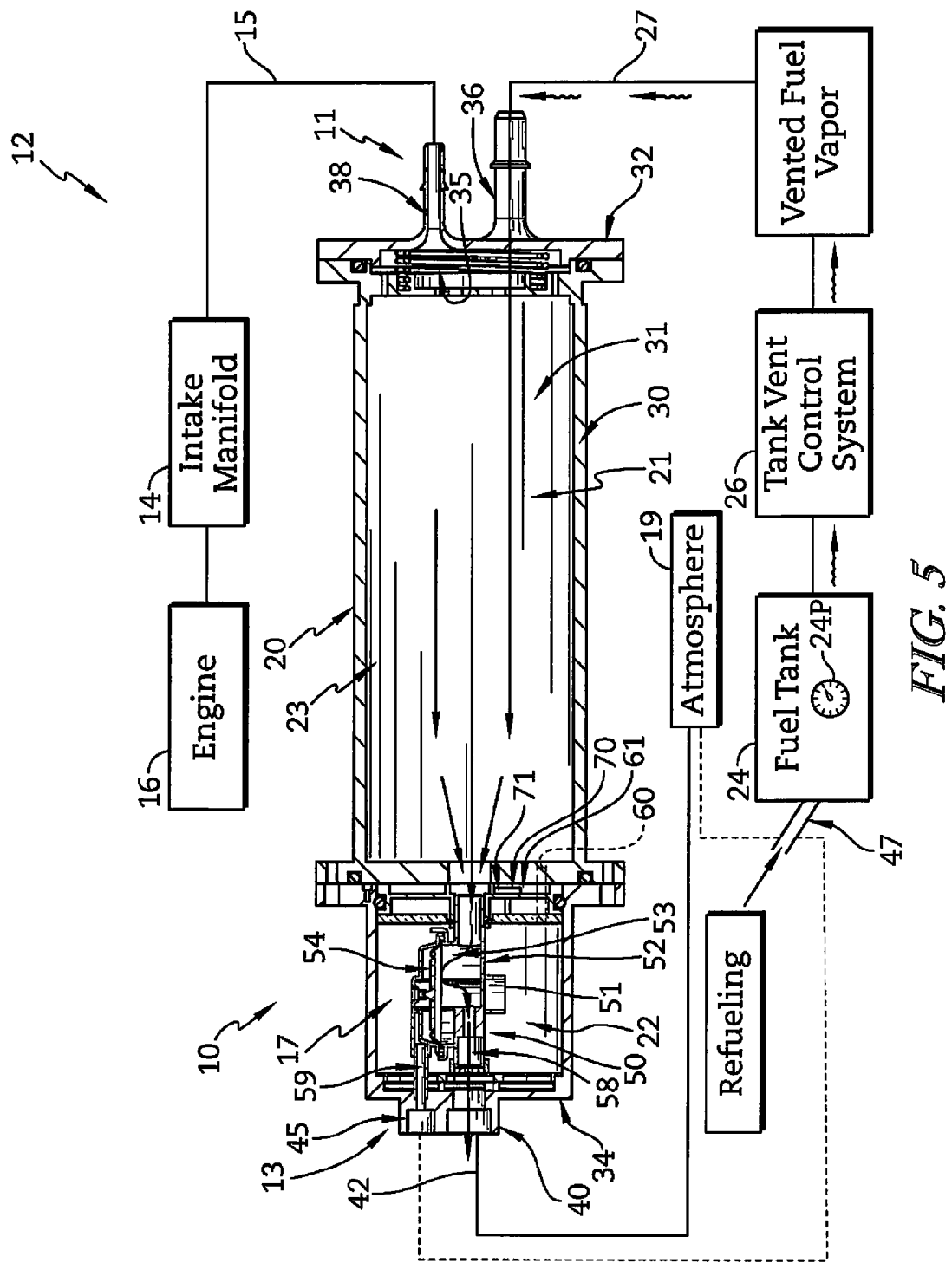
Figure 5A:
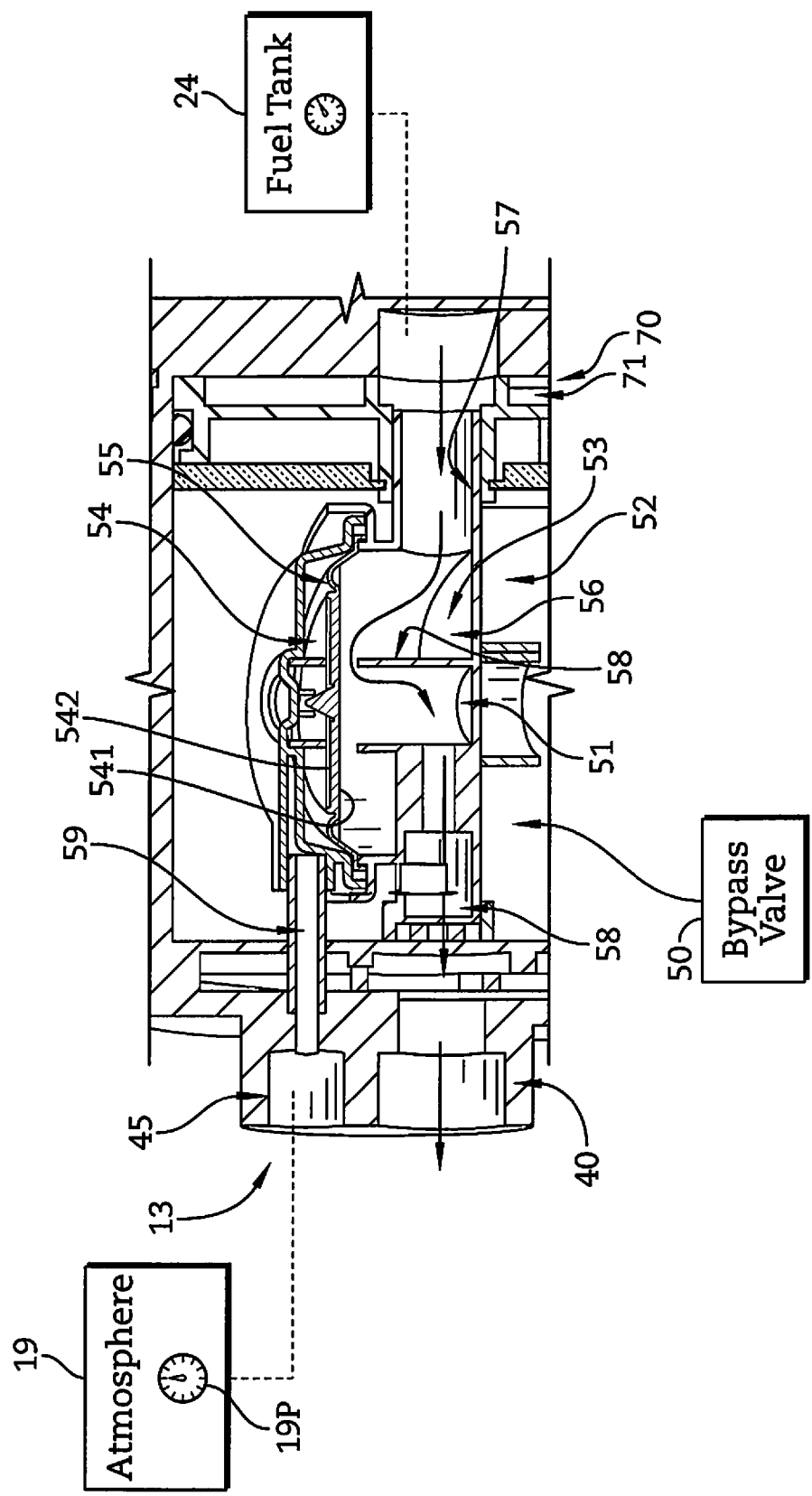
Figure 6:
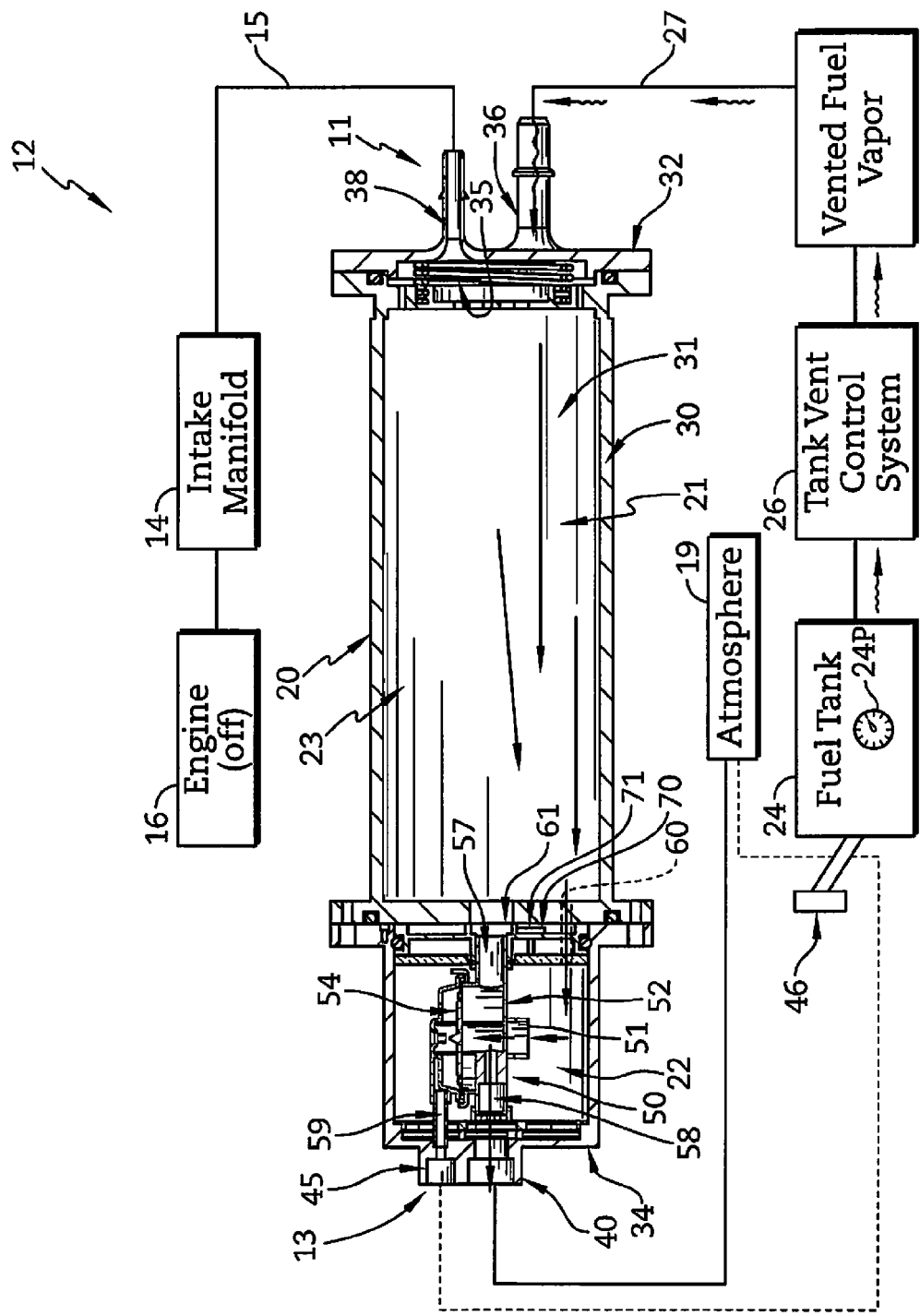
Figure 7:
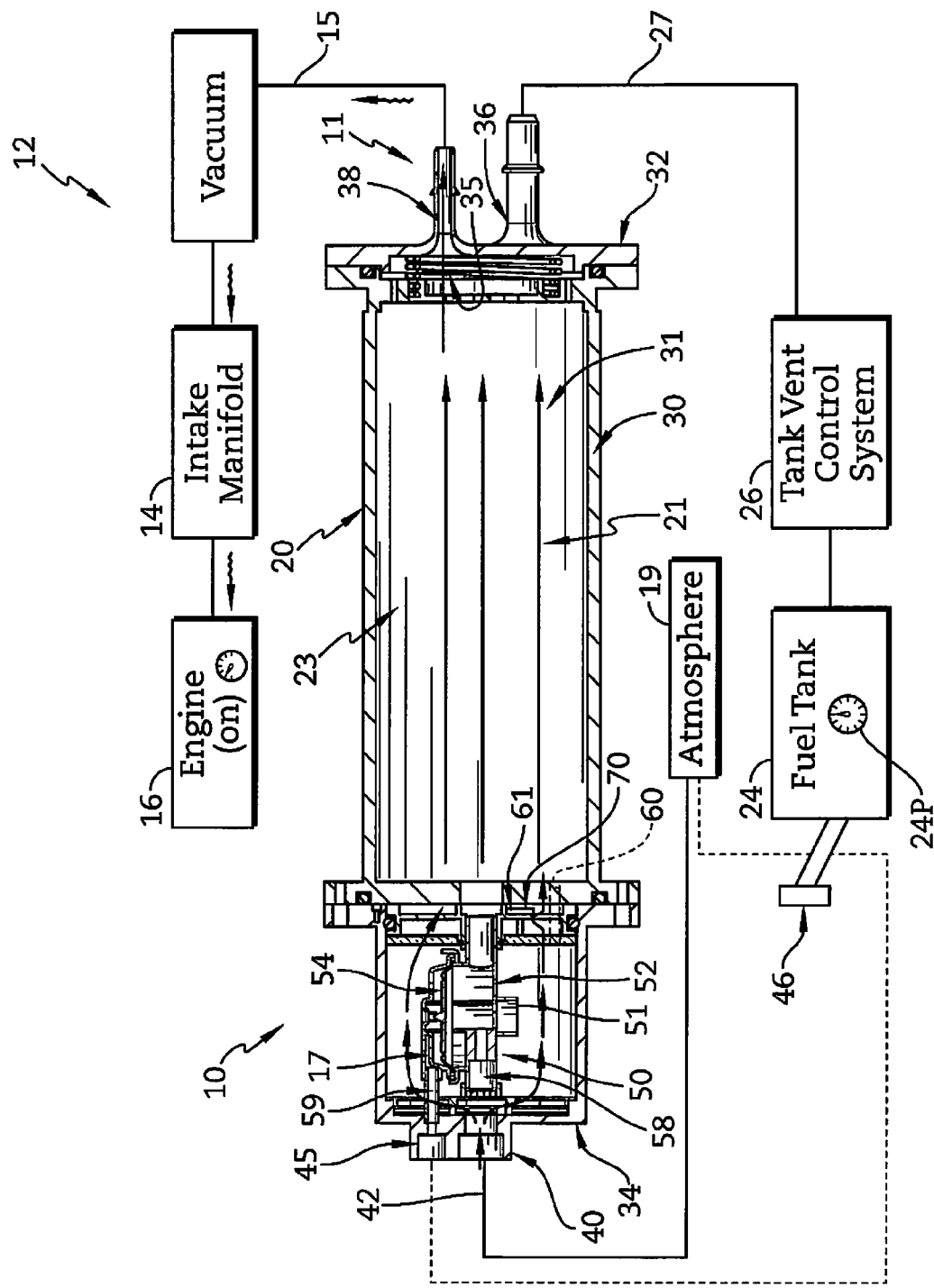
Figure 7B:
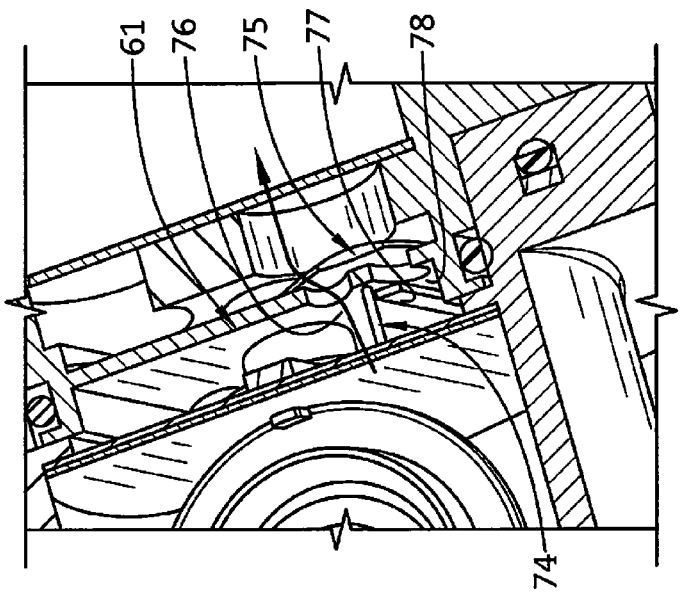
Figure 7A:
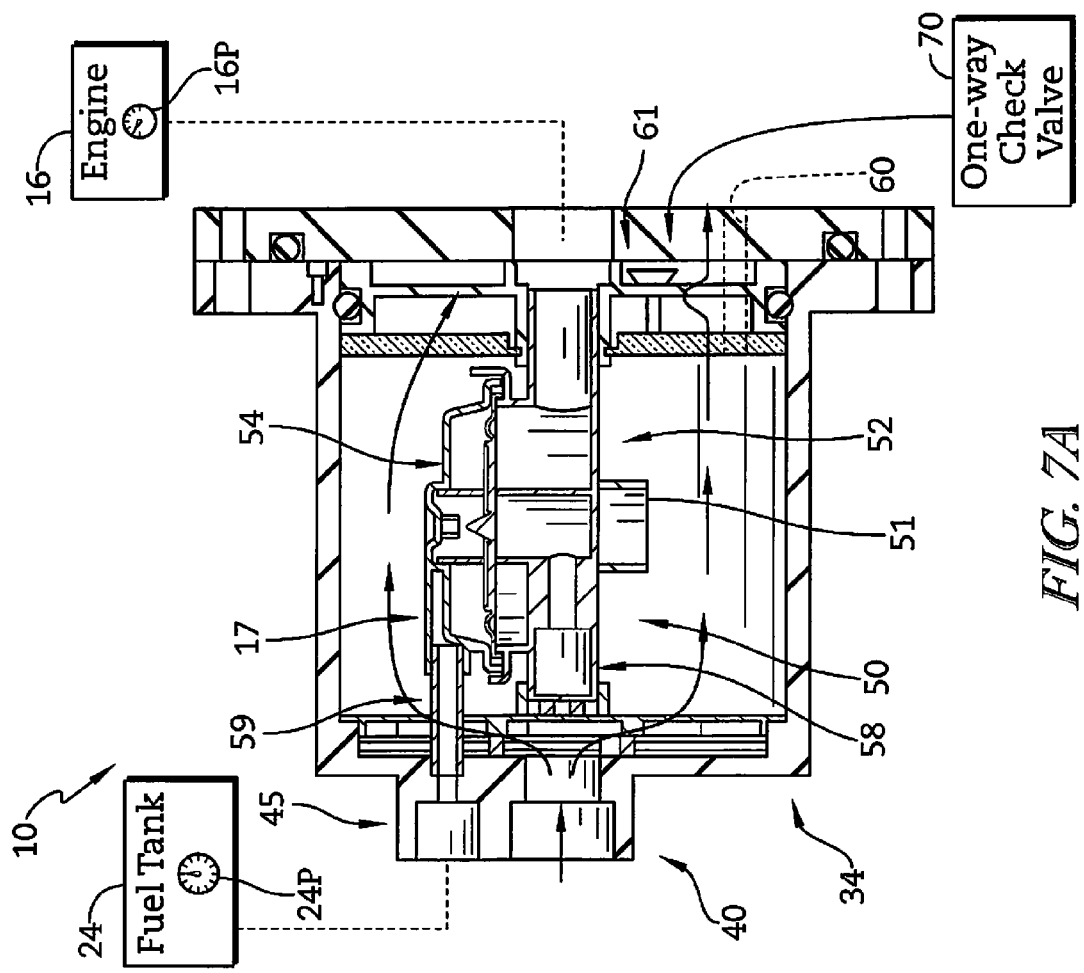
Figure 8:
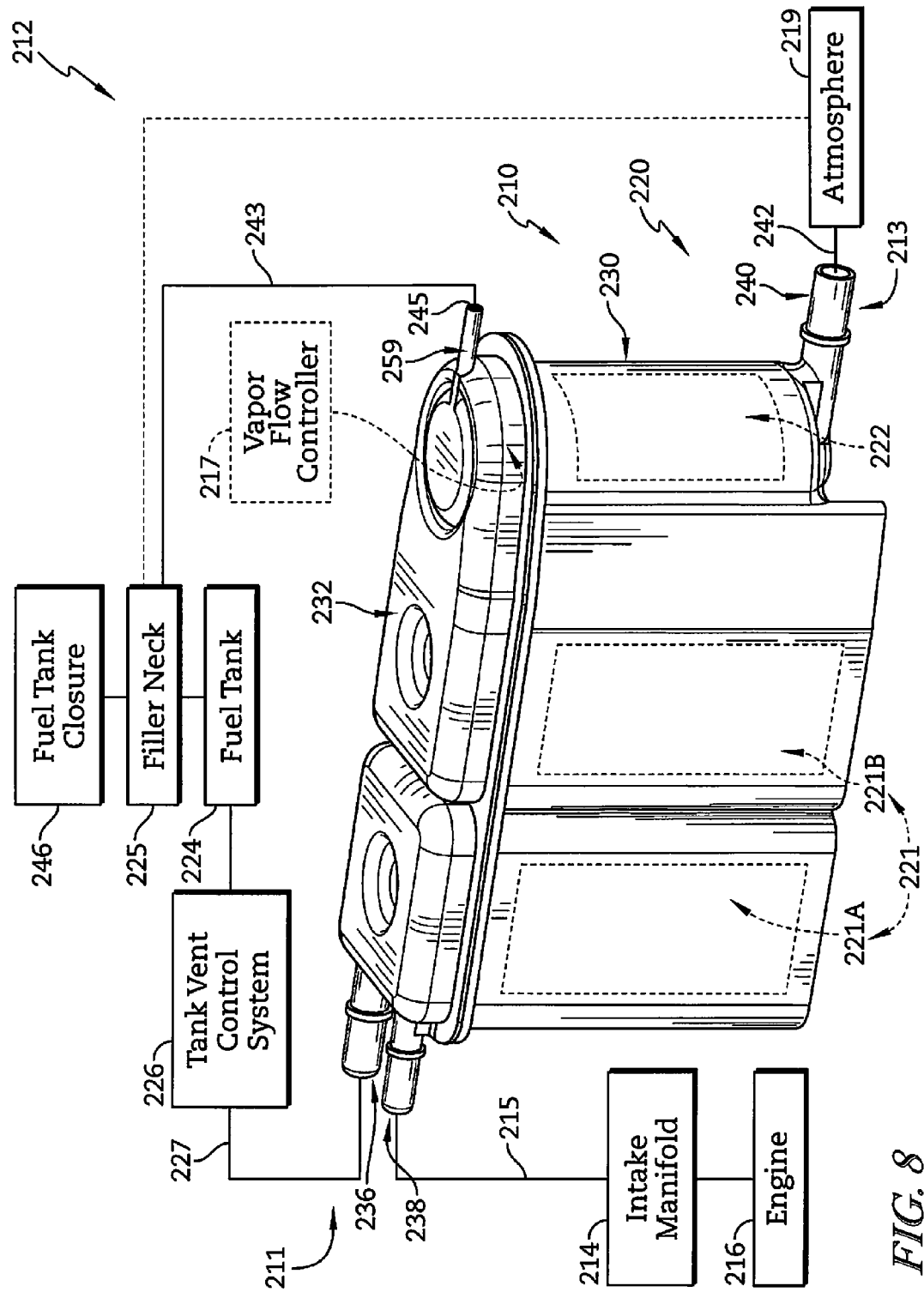
Figure 9:
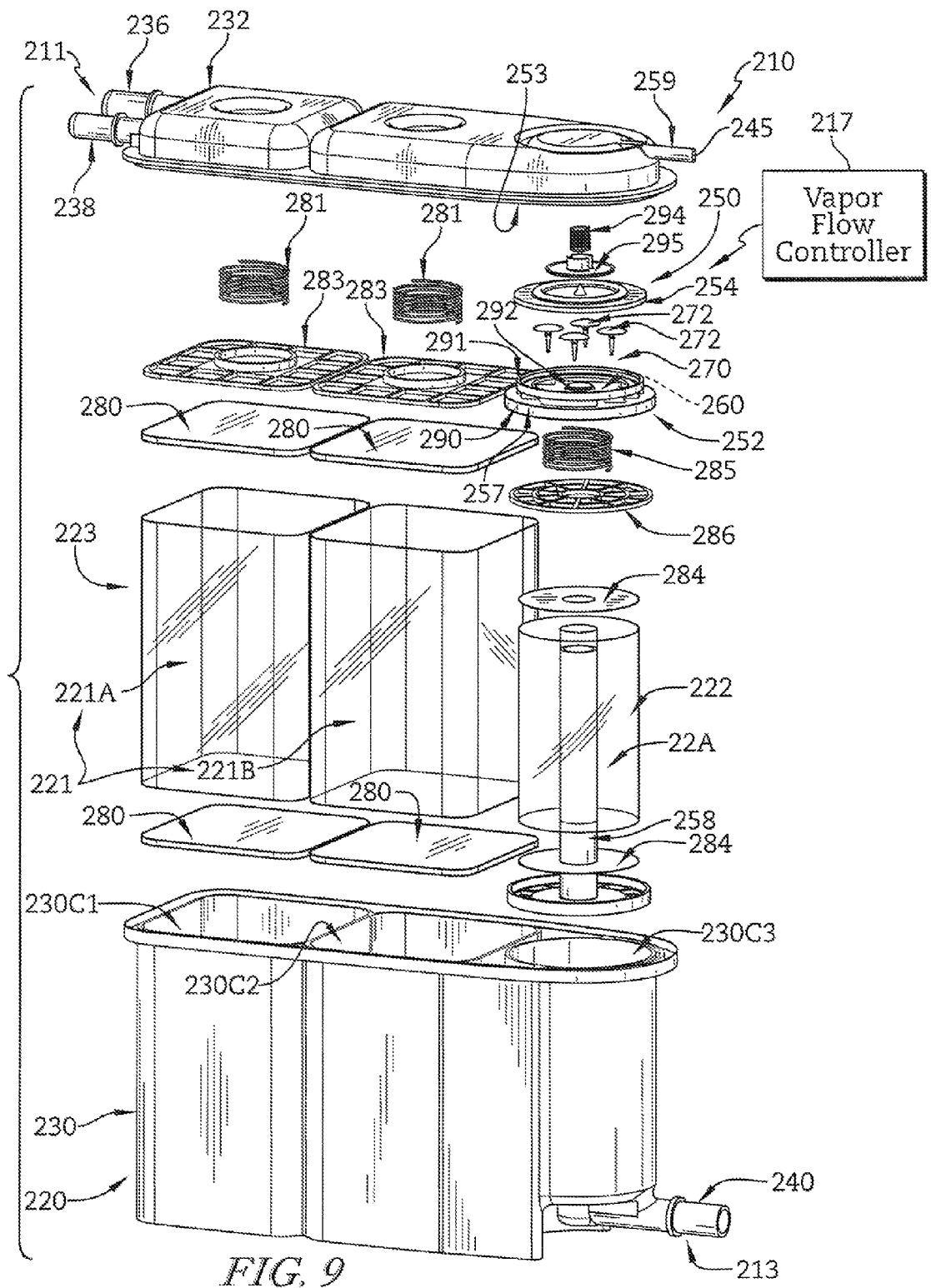
Figure 9A:
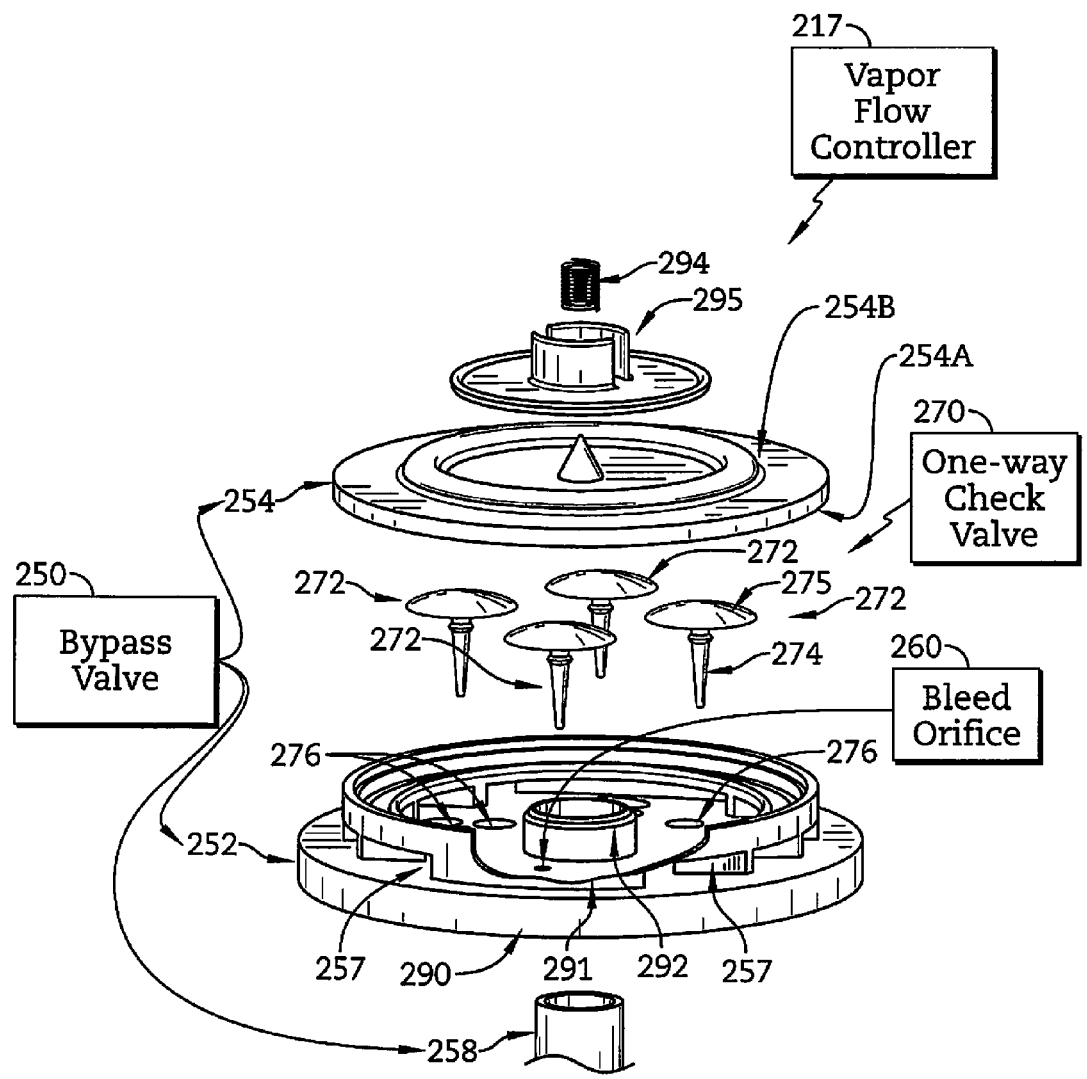
Figure 10:
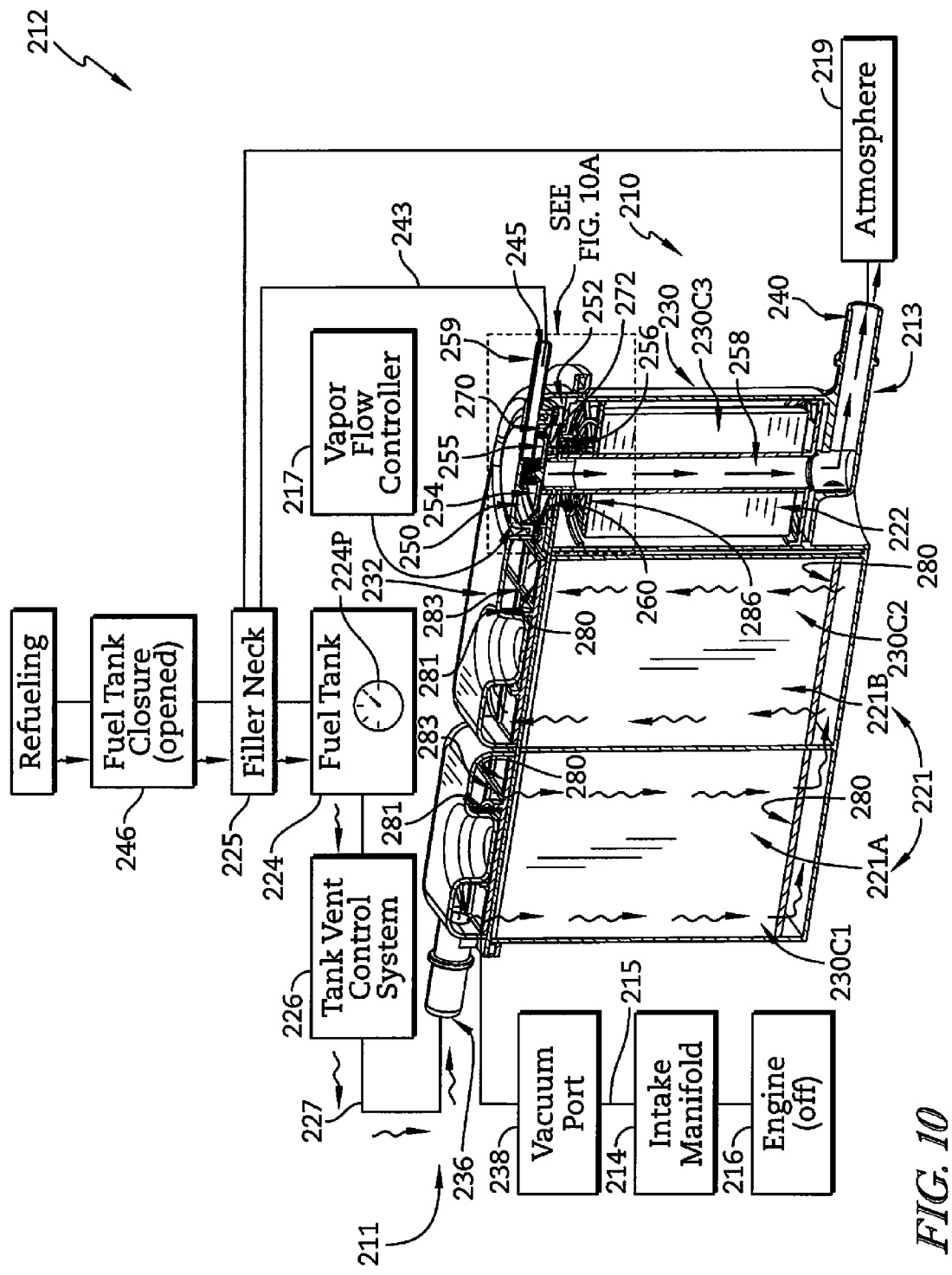
Figure 11:
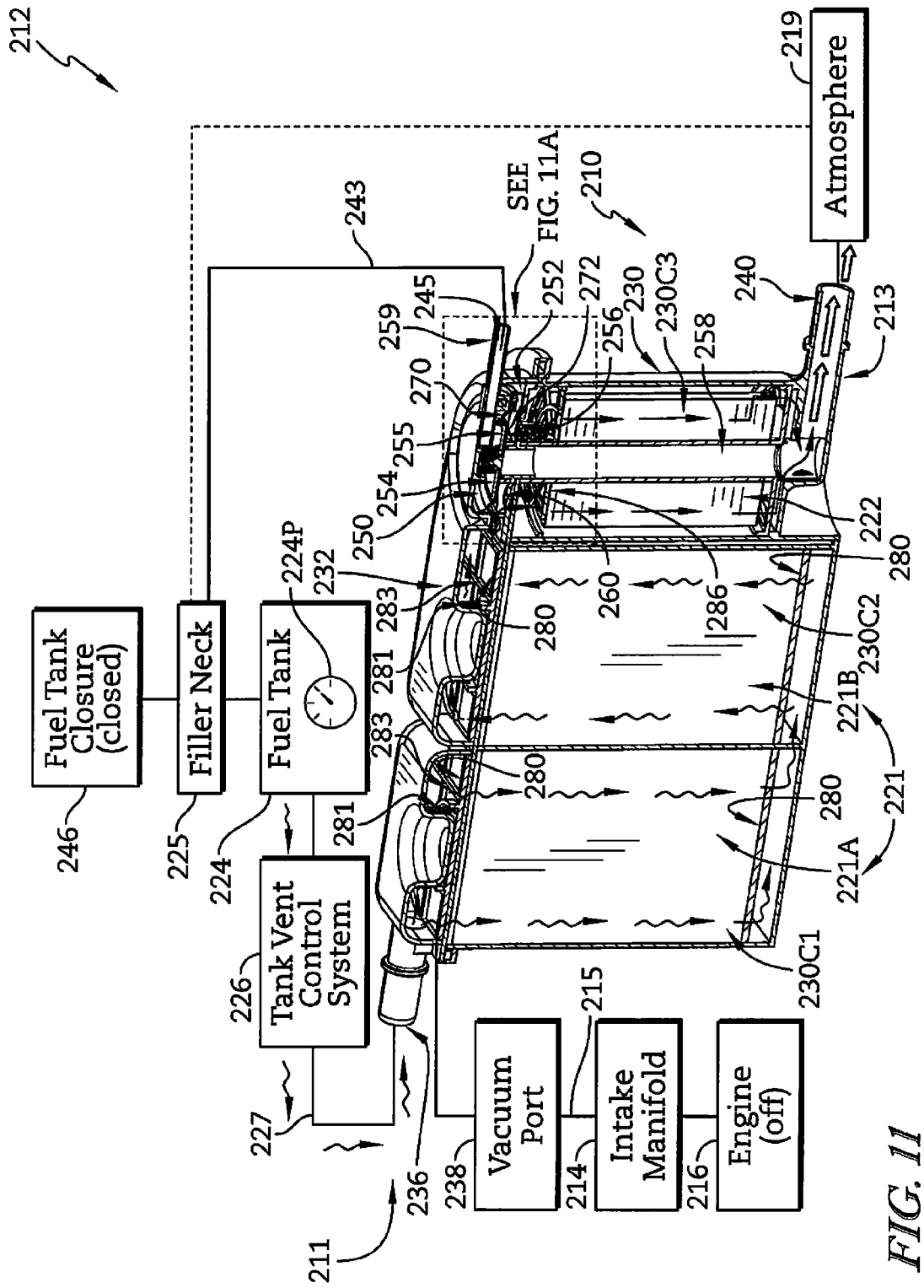
Figure 11A:
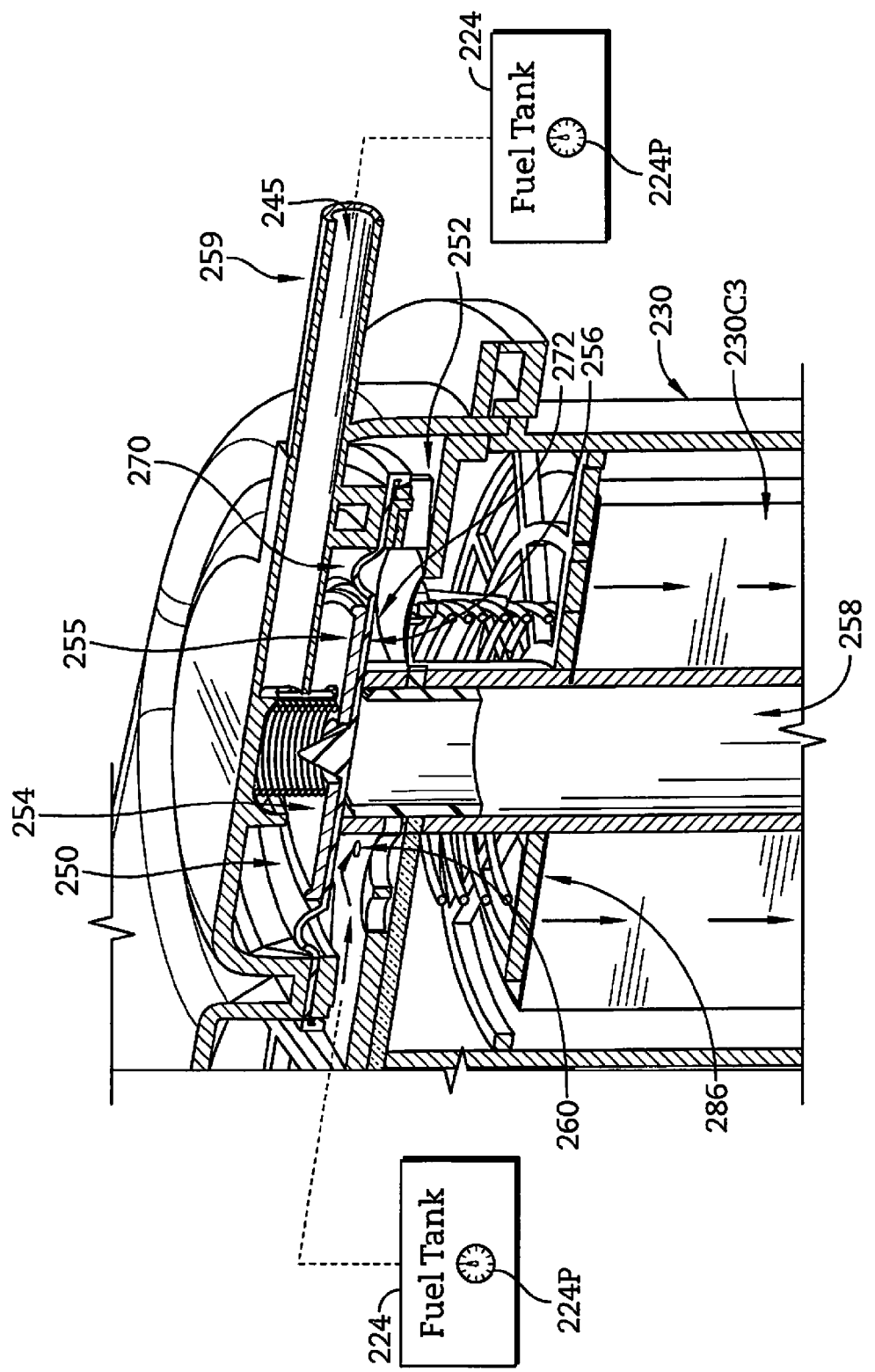
Figure 12:
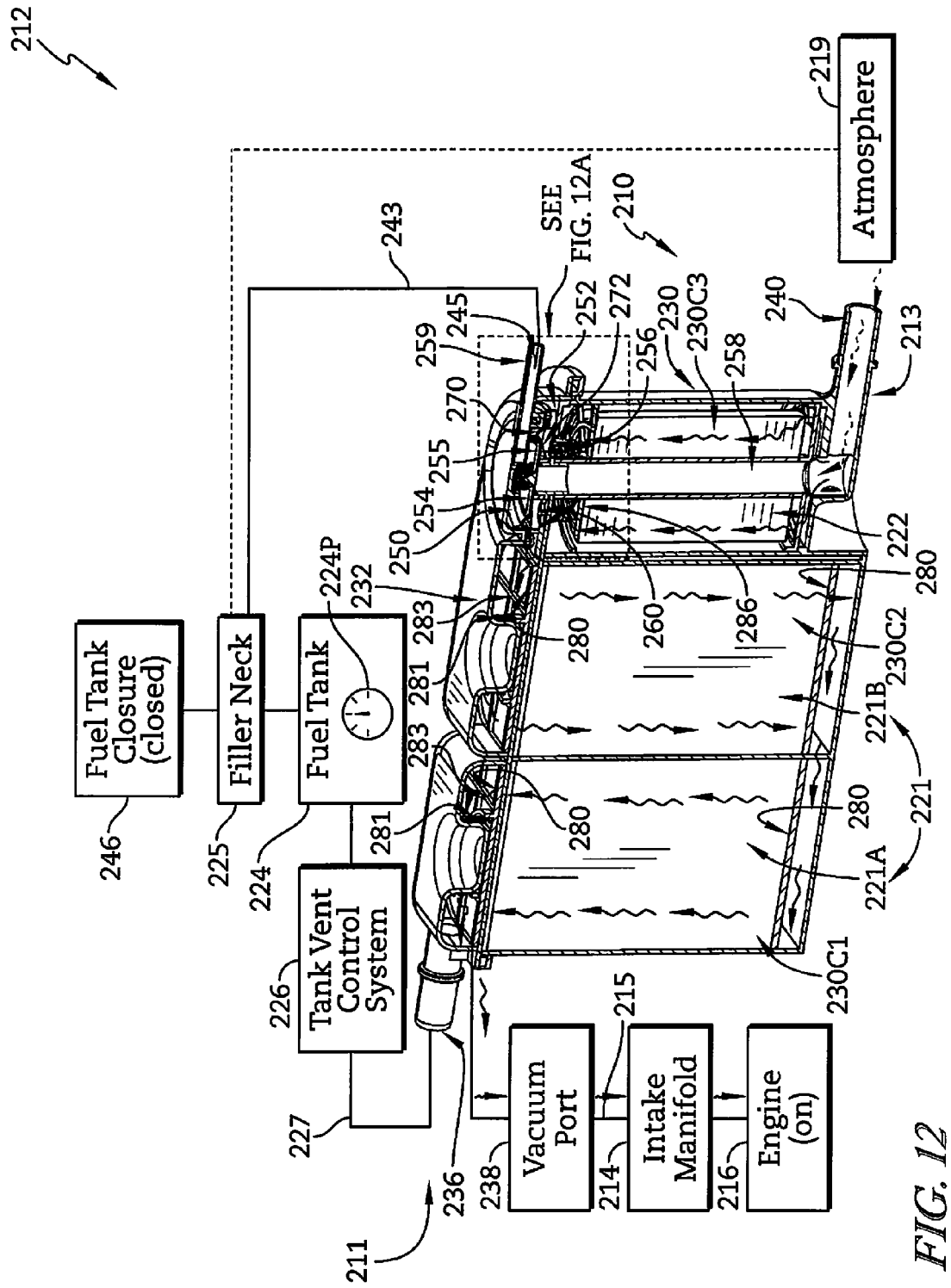
Figure 12A:
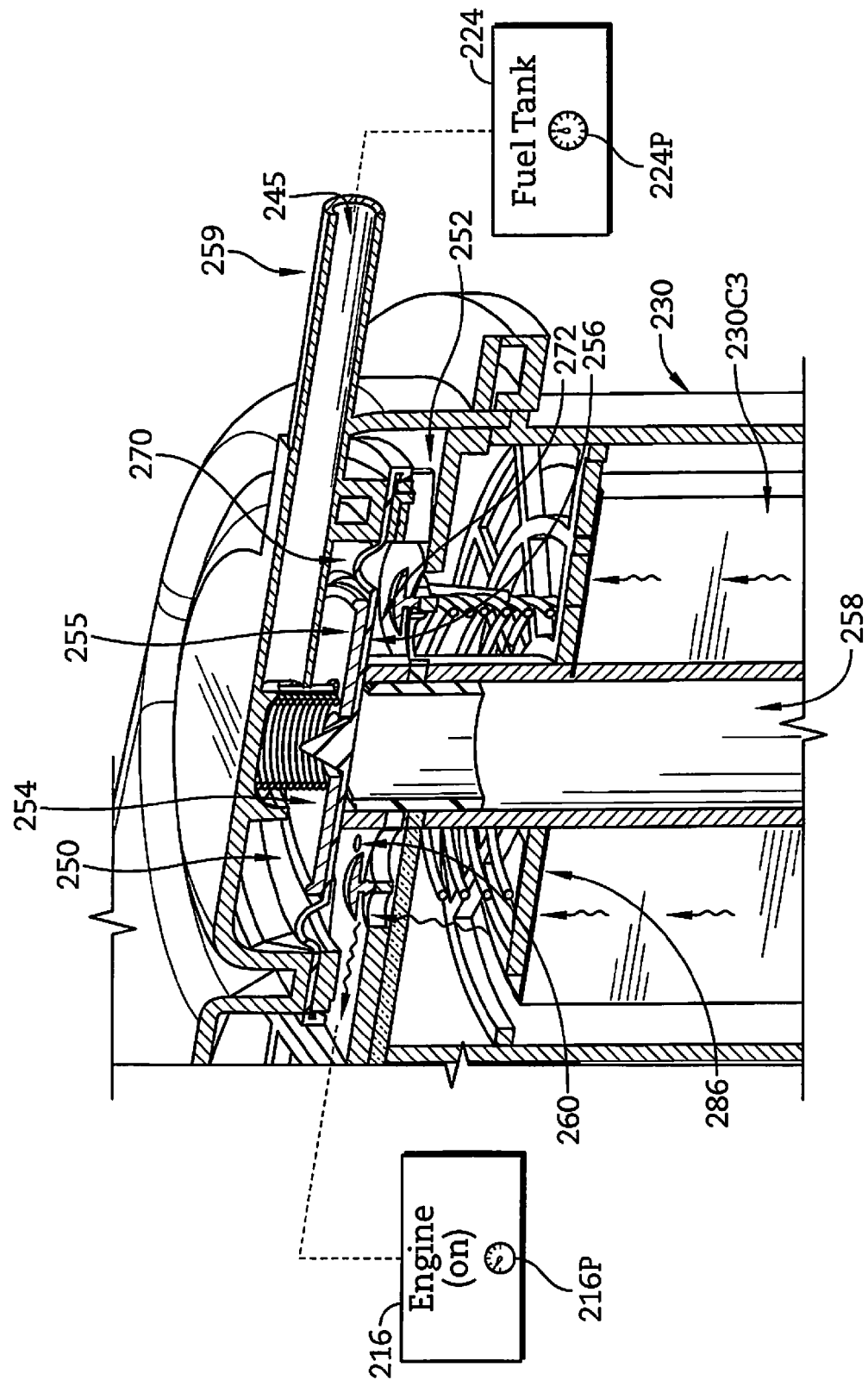

FIG. 2 is a diagrammatic view of an illustrative embodiment of an engine fuel system in accordance with the present disclosure showing fuel vapor vented from the fuel tank to the canister along a path through the first carbon bed and directed by the bypass valve around the second carbon bed before being discharged to the atmosphere during refueling of the fuel tank while the engine is off so that the second carbon bed remains clean during refueling;

FIG. 3 is a diagrammatic view similar to FIG. 2 showing fuel vapor vented from the fuel tank to the canister along a path through the first carbon bed and allowed through the bleed orifice to the second carbon bed before being discharged to the atmosphere during normal operation of the engine fuel system such as during daily expansion of fuel in the fuel tank caused by warming of the fuel tank so that the fuel vapor is double filtered by the clean second carbon bed during normal operation venting;

FIG. 4 is a diagrammatic view similar to FIGS. 2 and 3 showing "purging" of the two separate carbon beds in the canister by means of a purge vacuum from the intake manifold when the engine is on (during normal vehicle operation) to cause fuel vapor (laden with hydrocarbons released from both of the first and second carbon beds) to move thorough a purge port into the intake manifold for combustion in the engine;

FIG. 5 is a view similar to FIG. 1 of a vehicle fuel system including a sectional view of a canister system showing venting caused by refueling;

FIG. 5A is a detail view of a flow-control valve included in the illustrative vapor flow controller that provides a bypass valve showing the flow-control valve in an opened position allowing fuel vapor to bypass the second carbon bed and discharge to the atmosphere;

FIG. 6 is a view similar to FIG. 5 showing venting of fuel vapor under normal operating conditions caused by fuel tank heating;

FIG. 6A is a detail view of the vapor flow controller included in the fuel vapor recovery canister of FIG. 6 showing the configuration of the fuel vapor controller during venting of fuel vapor under normal operating conditions;

FIG. 6B is a detail view of a bleed orifice included in the vapor flow controller showing fuel vapor moving through the orifice and into the second carbon bed where additional hydrocarbons not stored (adsorbed) by the first carbon bed are captured (adsorbed) before double cleaned vapor is discharged to the atmosphere;

FIG. 7 is a view similar to FIGS. 5 and 6 showing purging of the first and second carbon beds while the vehicle engine is on;

FIG. 7A is a detail view of the vapor flow controller included in the fuel vapor recovery canister of FIG. 7 showing the configuration of the fuel vapor controller during purging of the first and second carbon beds while the vehicle engine is on;

FIG. 7B is a detail view of an umbrella valve included in the illustrative vapor flow controller to provide a one-way check valve showing the umbrella valve opened to allow atmospheric air to move from the second carbon bed to the first carbon bed during purging so that hydrocarbons from both first and second beds are carried to the intake manifold and engine;

FIG. 8 is a partially diagrammatic view of a second vehicle fuel system including a sectional view of a second canister system in accordance with the present disclosure and showing that the canister system includes first and second carbon beds along with a vapor flow controller configured to configured to control the flow of fuel vapor from fuel tank through canister;

FIG. 9 is an exploded perspective assembly view of the canister system of FIG. 8 showing that the canister system includes a housing having a lower shell and a cover, the first carbon bed having first and second portions received in rectangular compartments of the lower shell, the second carbon bed received in a cylindrical compartment of the lower shell, and the vapor flow controller mounted adjacent to the second carbon bed, FIG. 9A is a detailed exploded perspective view of the vapor flow controller shown in FIG. 9 showing that the vapor flow controller includes a bypass valve, a bleed hole, and a one way valve and showing that the bypass valve includes a diaphragm seat, a flexible diaphragm, and an outlet tube;

FIG. 10 is a view similar to FIG. 8 of a vehicle fuel system including a sectional view of the canister system showing venting caused by refueling in which the vapor flow controller allows fuel vapor to bypass the second carbon bed and discharge to the atmosphere;

FIG. 10A is a detail view of the vapor flow controller from FIG. 10 showing the configuration of the vapor flow controller during venting caused by refueling in which the vapor flow controller allows fuel vapor to bypass the second carbon bed and discharge to the atmosphere;

FIG. 11 is a view similar to FIG. 10 showing venting during normal operation caused by fuel tank heating in which the vapor flow controller allows fuel vapor to moving through an orifice and into the second carbon bed where additional hydrocarbons not stored (adsorbed) by the first carbon bed are captured (adsorbed) before double cleaned vapor is discharged to the atmosphere;

FIG. 11A is a detail view of the vapor flow controller from FIG. 11 showing the configuration of the vapor flow controller during normal operation caused by fuel tank heating;

FIG. 12 is a view similar to FIGS. 10 and 11 showing purging of the first and second carbon beds while the vehicle engine is on in which umbrella valves included in the illustrative vapor flow controller are opened to allow atmospheric air to move from the second carbon bed to the first carbon bed during purging so that hydrocarbons from both first and second beds are carried to the intake manifold and engine; and FIG. 12A is a detail view of the vapor flow controller from FIG. 12 showing the configuration of the vapor flow controller during purging of the carbon beds.

DETAILED DESCRIPTION

Figure 1A:
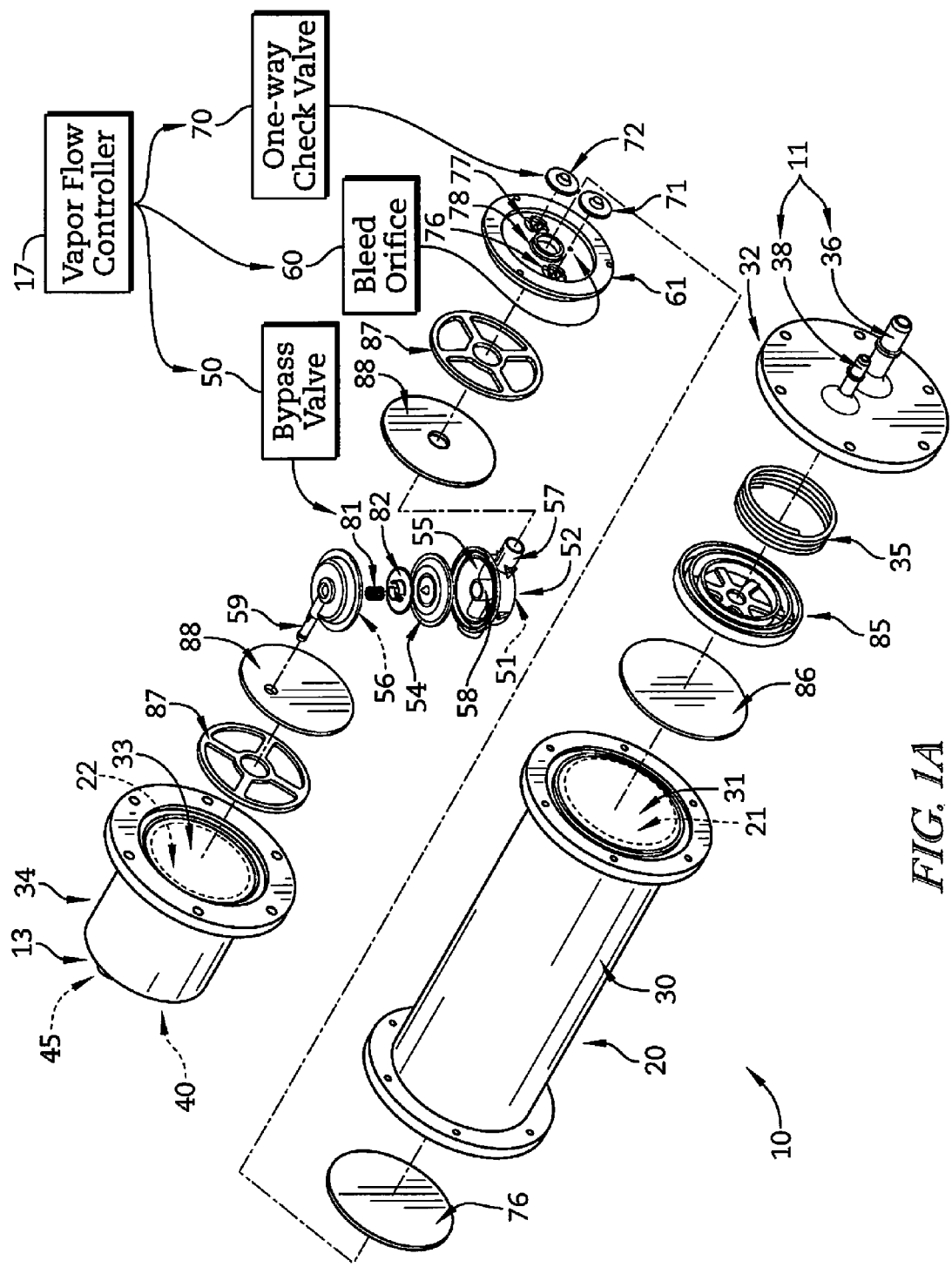
Figure 1B:
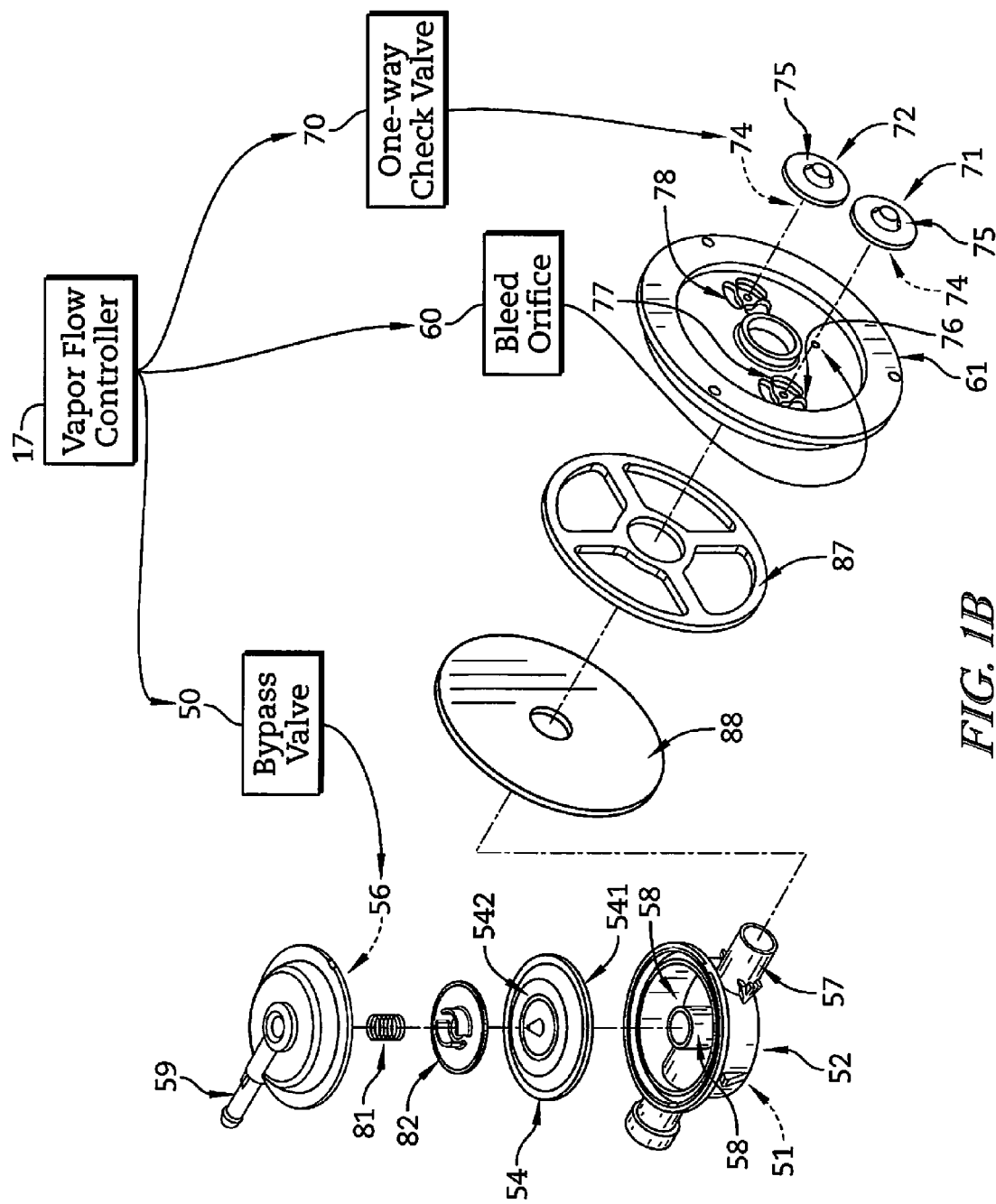

A first fuel vapor recovery canister 10 is shown in FIGS. 1-1B and a second fuel vapor recovery canister 210 is shown in FIGS. 8-9A. Each fuel vapor recovery canister 10, 210 is adapted for use in a corresponding vehicle fuel system 10, 210, as shown in FIGS. 1 and 8. Vapor flow controllers 17, 217 included in fuel vapor recovery canisters 10, 210 are configured to control the flow of fuel vapor through fuel vapor recovery canisters 10, 210 and to allow low levels of hydrocarbon discharge from fuel vapor recovery canisters 10, 210 during normal operation in associated vehicle fuel systems 12, 212 as suggested generically in FIGS. 2-4 and, particularly, in FIGS. 5-7B and FIGS. 9-12A.

Vapor flow controllers 17, 217 provide valve means for directing flow of at least some fuel vapor moving through fuel vapor recovery canisters 10, 210 from a first carbon bed 21, 221 included in fuel vapor recovery canisters 21, 221 to atmosphere 19 without passing through a second carbon bed 22, 222 included in fuel vapor recovery canisters 10, 210 during refueling of a vehicle as suggested in FIGS. 2, 5, and 10. Accordingly, second carbon beds 22, 222 of fuel vapor recovery canisters 10, 210 remain substantially clean for use during normal operation of vehicle fuel systems 12, 212. Vapor flow controllers 17, 217 further provide valve means for directing the flow of fuel vapor from first carbon beds 21, 221 through second carbon bed 22, 222 causing interaction between fuel vapor and second carbon beds 22, 222 before being discharged to atmosphere 19 during normal operation of the vehicle as suggested in FIGS. 3, 6, and 11. Accordingly, hydrocarbons suspended in fuel vapor passing through fuel vapor recovery canister 10, 210 during normal operation can be adsorbed by carbon in second carbon beds 22, 222 and may be removed from fuel vapor discharged from fuel vapor recovery canisters 10, 210 providing a low level of hydrocarbon discharge to atmosphere 19.

A fuel vapor recovery canister 10 is included in a vehicle fuel system 12 associated with a vehicle having an intake manifold 14 communicating with canister 10 and an engine 16 coupled to intake manifold 14 as suggested in FIG. 1. Canister 10 has a filter bed housing 20 containing a vapor flow controller 17 and a hydrocarbon filter 23 comprising first and second carbon beds 21, 22. Canister 10 is configured to clean fuel vapor vented from fuel tank 24 during, for example, tank refueling and daily (diurnal) expansion of fuel/fuel vapor caused by heating of the fuel tank during the day. Canister 10 is cleaned or purged using a vacuum provided by intake manifold 14 when engine 16 is running.

Vapor flow controller 17 is configured to control the flow of fuel vapor from fuel tank 24 through canister 10 blocking most fuel vapor discharged during refueling from second carbon bed 22 while allowing most fuel vapor discharged during daily expansion of fuel/fuel vapor into second carbon bed 22 as suggested in FIGS. 2 and 3. As a result of blocking most refueling fuel vapor from second carbon bed 22, second carbon bed 22 remains relatively clean and is not saturated with hydrocarbons during refueling. Consequently, fuel vapor discharged more frequently (e.g., fuel vapor discharged during daily expansion of fuel/fuel vapor or during other normal operating conditions) is allowed to pass through second carbon bed 22 and is stripped of additional hydrocarbons stored (adsorbed) by second carbon bed 22 before being discharged to the atmosphere.

A tank vent control system 26 is configured to conduct fuel vapor discharged from fuel tank 24 into a fuel vapor recovery canister 10 through a canister inlet 11 as suggested in FIG. 1. It is within the scope of this disclosure to use any suitable system of conduits and valves to produce a system to conduct fuel vapor from fuel tank 24 to canister 10 to be cleaned as the fuel vapor passes through first and second carbon beds 21, 22 included in canister 10, and filtered air is discharged from canister 10 through a canister outlet 13 to the atmosphere 19.

In use, hydrocarbon material (not shown) entrained in fuel vapor discharged from fuel tank 24 into canister 10 through canister inlet 13 and passed through first carbon bed 21 and sometimes second carbon bed 22 of hydrocarbon filter 23 is captured or stored (e.g., adsorbed) on charcoal granules included in carbon beds 21, 22. Therefore, hydrocarbon material is removed from fuel vapor as that fuel vapor passes through first and second carbon beds 21, 22 of hydrocarbon filter 23 and a stream of single or double cleaned vapor is discharged from canister 10 to the atmosphere 19 during a vapor-cleaning process that can occur during tank-refueling activities and during daily expansion of fuel/fuel vapor.

Filter bed housing 20 includes a tube 30, an inlet cover 32 formed to include canister inlet 11 and coupled to one end of tube 30, and an outlet cover 34 formed to include canister outlet 13 and coupled to an opposite end of tube 30 as shown, for example, in FIG. 1. Tube 30 is formed to include an interior region 31 arranged to communicate with canister inlet 11 and canister outlet 13 as suggested in FIG. 1. First carbon bed 21 is arranged to lie in an upstream portion of interior region 31 as suggested in FIG. 1. Second carbon bed 22 is arranged to lie a cavity 33 formed in outlet cover 34 downstream of interior region 31 as suggested in FIG. 1.

Inlet cover 32 includes a fuel vapor port 36 coupled to conduit 27 to admit fuel vapor discharged from fuel tank 24 into canister 10 via tank vent control system 26 during a tank-refueling cycle (and sometimes during normal engine operation). Inlet cover 32 also includes a vacuum port 38 coupled to a conduit 15 leading to intake manifold 14 to apply a vacuum provided via intake manifold 14 to an interior region 31 formed in tube 30 during a canister-purge cycle. Fuel vapor port 36 and vacuum port 38 cooperate to define canister inlet 11 in an illustrative embodiment of the present disclosure.

Outlet cover 34 includes an air port 40 coupled to conduit 42 to discharge cleaned vapor from canister 10 to atmosphere 19 during the tank-refueling cycle. Air port 40 is configured to define canister outlet 11 in the illustrated disclosure. Outlet cover 34 in the illustrative embodiment also includes a valve-control port 45 coupled to conduit 43 coupled to a fuel tank closure 46 such that valve-control port 45 is open to atmosphere 19 when fuel tank closure 46 is opened by a user removing a fuel cap (not shown).

First carbon bed 21 of hydrocarbon filter 23 comprises a first group of carbon granules as suggested in FIG. 1. It is within the scope of this disclosure to provide any suitable means for retaining these carbon granules in a packed arrangement in interior region 31 of tube 30 near inlet cover 32 and canister inlet 11 and between vapor flow controller 17 and canister inlet 11 to expose those carbon granules to vapor flowing through interior region 31 between inlet and outlet covers 32, 34. In the illustrative embodiment, a bias spring 35 along with a force distributor plate 85 and a vapor-permeable pads 86 are used to pack the carbon granules of the first carbon bed 21 as suggested in FIG. 1A. It is within the scope of the present disclosure to divide first carbon bed 21 into two or more groups of carbon granules to help with adsorption and bleed emission.

Second carbon bed 22 of hydrocarbon filter 23 comprises a second group of carbon granules as suggested in FIG. 1. In the illustrative embodiment, force distributor plates 87 and a vapor-permeable pads 88 are used to pack the carbon granules of the second carbon bed 22 as suggested in FIG. 1A. It is within the scope of this disclosure to provide any suitable means for retaining the carbon granules in a packed arrangement in outlet cover 34 adjacent to canister outlet 11 and in spaced-apart relation to carbon granules in first carbon bed 21.

Vapor flow controller 17 illustratively includes a bypass valve 50, a bleed orifice 60, and a one-way check valve 70 that cooperate to control the movement of fuel vapor through the canister 10 as shown in FIG. 1. Bypass valve 50 is illustratively configured to be opened when fuel tank closure 46 is opened during tank refueling so that most of the fuel vapor vented from fuel tank 24 moves through first carbon bed 21 but not through second carbon bed 22 along a first flow path. Accordingly, second carbon bed 22 remains relatively clean to store hydrocarbons from fuel vapor vented during daily (diurnal) expansion of fuel/fuel vapor as suggested in FIGS. 2 and 5. Bleed orifice 60 is sized to allow pressurized fuel vapor vented from fuel tank 24 to move from first carbon bed 21 to second carbon bed 22 along a second flow path when bypass valve 40 is closed so that vapor discharged during daily (diurnal) expansion of fuel/fuel vapor is filtered by both first and second carbon beds 21, 22 as suggested in FIGS. 3 and 6. Because bleed orifice 60 is always open, some nominal amount of flow through orifice 60 between the first and second carbon beds 21, 22 occurs during refueling and during purging. One-way check valve 70 allows flow from second carbon bed 22 to first carbon bed 21 along a third flow path during purging when vacuum provided by intake manifold 14 pulls atmospheric air through canister 10.

Bypass valve 50 is illustratively arranged in outlet cover 34 of canister 10 as shown in FIG. 5A. Bypass valve 50 of the illustrative embodiment includes a valve cup 52 defining an internal valve volume 53, a flexible diaphragm 54 that divides valve volume 53 into a lower portion 55 and an upper portion 56, an inlet tube 57, an outlet tube 58, and a control tube 59. Valve cup 52 is formed to include a bleed hole 51 opening lower portion 55 of valve volume 53 to a relatively small flow from second carbon bed 22. Flexible diaphragm 54 moves within valve volume 53 to block or allow a relatively large flow of fuel vapor from moving through valve volume 53 bypassing second carbon bed 22.

Inlet tube 57 provides fluid communication between first carbon bed 21 and lower portion 55 of valve volume 53 as shown in FIGS. 5 and 5A. Outlet tube 58 provides fluid communication between lower portion 55 of valve volume 53 and atmosphere 19. Control tube 59 provides fluid communication between upper portion 56 of valve volume 53 and valve-control port 45 so that upper portion 56 of valve volume 53 is open to atmosphere 19 when fuel tank closure 46 is opened as suggested in FIG. 5. Flexible diaphragm 54 is biased toward a first position closing off inlet tube 57 from valve volume 53 by a spring (not shown) but may be moved to a second position opening up inlet tube 57 when control tube 59 is open to atmosphere 19.

Bypass valve 50 moves from being normally closed to open when (1) fuel tank closure 46 is opened by a user removing a fuel cap and (2) pressure in fuel tank 24 is above pressure of atmosphere 19 as suggested in FIGS. 2, 5, and 5A. During refueling, bypass valve 50 is moved to an opened position in response to opening of fuel tank closure 46 by a user removing a fuel cap and pressure in fuel tank 24 as suggested by fuel tank pressure 24P in FIGS. 2, 5, and 5A. Particularly, when fuel tank closure 46 is opened, upper portion 56 of valve volume 53 and a first side 541 of the diaphragm 54 are exposed to atmospheric pressure from a fuel tank filler neck 47 via valve-control port 45 and control tube 59 attached to filler neck 47 as suggested in FIG. 5. Further, lower portion 55 of valve volume 53 and a second side 542 of diaphragm 54 are exposed to greater than atmospheric pressure from fuel tank 24 via inlet tube 57. The pressure difference between upper portion 56 and lower portion 55 of valve volume 53 causes flexible diaphragm 54 to bend toward upper portion 56 and the second position at which time outlet tube 58 is open to conduct fuel vapor from first carbon bed 21 moving through inlet tube 57 to atmosphere 19 as shown in FIGS. 5 and 5A.

In the illustrative embodiment, bypass valve 50 also includes a bias spring 81 and bias plate 82 as shown in FIG. 1B. Bias spring 81 applies a small force that resists movement of the flexible diaphragm 54 out of engagement with the outlet tube 58 to bias the bypass valve 50 toward the closed position.

Bleed orifice 60 provides fluid communication between first carbon bed 21 and second carbon bed 22 through a wall 61 arranged between first and second carbon beds 21, 22 as shown in FIG. 6A. During normal operation of fuel system 12, when fuel tank closure 46 is closed, bypass valve 50 is closed and fuel vapor exiting fuel tank 24 moves from first carbon bed 21 through bleed orifice 60 into second carbon bed 22 and then through outlet tube 58 via bleed hole 51 to atmosphere 19 along the second flow path. Accordingly, vapor discharged during normal operation is double cleaned in both first and second carbon beds 21, 22 and carries very few (if any) hydrocarbons into the atmosphere.

One-way check valve 70 is adapted to allow atmospheric air and fuel vapor to be pulled through second carbon bed 22 and first carbon bed 21 into intake manifold 14 and engine 16 along the third flow path during purging of canister 10 as suggested in FIGS. 4 and 7. In the illustrative embodiment, one-way check valve 70 illustratively includes umbrella valves 71, 72 as shown in FIG. 6A. Each umbrella valve 71, 72 includes a conical diaphragm 75 coupled to a stem 74 as shown in FIG. 7A. Conical diaphragm 75 opens toward wall 61 and is adapted to block or allow flow through purge holes 76, 77, 78 formed in wall 61. Particularly, during purging, atmospheric air and fuel vapor being pulled through second carbon bed 22 from atmosphere 19 acts upon conical diaphragm 75 through purge holes 76, 77, 78 causing conical diaphragm 75 to flex away from wall 61 and allow flow through purge holes 76, 77, 78 as suggested in FIG. 7.

In illustrative embodiments, the vapor flow controller 17 in the canister 10 controls the path of the fuel vapors moving through the canister 10. During refueling, the diaphragm 54 of the bypass valve 50 is open with the fuel cap off such that the fuel tank closure 46 is opened. This allows the fuel vapor during refueling to go through the first carbon bed 21 and exit the canister 10 without loading the second (last) carbon bed 22.

In illustrative embodiments, when the fuel cap is on and the fuel tank closure 46 is closed, the bypass valve 50 is in the closed position and allows the purge to pull the fresh air into the canister 10 cleaning the second carbon bed 22 and going to the first carbon bed 21 to be clean through the umbrella valves 71, 72 around the wall 61.

In illustrative embodiments, when the bypass valve 50 is closed and the purge is not running, the second carbon bed 22 is closed and only small amount of vapor will enter the second carbon bed 22 which is very clean and will lower the amount exiting the canister 10 during the daily (diurnal) heating of the fuel in the fuel tank 24 which leads to expansion and venting of fuel vapor.

In illustrative embodiments, the vapor flow controller 17 enables two operational modes for the canister 10. In the first, refueling mode, the second carbon bed 22 is isolated from all refueling loading. In the second, normal-operation mode, all fuel vapor is directed through both the first carbon bed 21 and the second carbon bed 22. The second carbon bed 22 is always purged during engine operation to prepare for the next fuel vent event.

A second fuel vapor recovery canister 210 included in a vehicle fuel system 212 associated with a vehicle is shown in FIG. 8. Canister 210 has a housing 220 containing a vapor flow controller 217 and a hydrocarbon filter 223 comprising first and second carbon beds 221, 222. Canister 210 is configured to clean fuel vapor vented from a fuel tank 224 during, for example, tank refueling and daily (diurnal) expansion of fuel/fuel vapor caused by heating of the fuel tank during the day. Canister 210 is cleaned or purged using a vacuum provided by intake manifold 214 when engine 216 is running.

Vapor flow controller 217 is configured to control the flow of fuel vapor from fuel tank 224 through canister 210 blocking most fuel vapor discharged during refueling from second carbon bed 222 while allowing most fuel vapor discharged during daily expansion of fuel/fuel vapor into second carbon bed 222 as suggested in FIG. 10. As a result of blocking most refueling fuel vapor from second carbon bed 222, second carbon bed 222 remains relatively clean and is not saturated with hydrocarbons during refueling. Consequently, fuel vapor discharged more frequently (e.g., fuel vapor discharged during daily expansion of fuel/fuel vapor or during other normal operating conditions) is allowed to pass through second carbon bed 222 and is stripped of additional hydrocarbons stored (adsorbed) by second carbon bed 222 before being discharged to the atmosphere.

A tank vent control system 226 is configured to conduct fuel vapor discharged from fuel tank 224 into a fuel vapor recovery canister 210 through a canister inlet 211 as suggested in FIG. 10. It is within the scope of this disclosure to use any suitable system of conduits and valves to produce a system to conduct fuel vapor from fuel tank 224 to canister 210 to be cleaned as the fuel vapor passes through first and second carbon beds 221, 222 included in canister 210, and filtered air is discharged from canister 210 through a canister outlet 213 to the atmosphere 219.

In use, hydrocarbon material (not shown) entrained in fuel vapor discharged from fuel tank 224 into canister 210 through canister inlet 213 and passed through first carbon bed 221 and sometimes second carbon bed 222 of hydrocarbon filter 223 is captured or stored (e.g., adsorbed) on charcoal granules included in carbon beds 221, 222. Therefore, hydrocarbon material is removed from fuel vapor as that fuel vapor passes through first and second carbon beds 221, 222 of hydrocarbon filter 223 and a stream of single or double cleaned vapor is discharged from canister 210 to the atmosphere 219 during a vapor-cleaning process that can occur during tank-refueling activities and during daily expansion of fuel/fuel vapor.

Filter bed housing 220 includes a lower shell 230 and a cover 232 coupled to lower shell 230 as shown in FIGS. 8 and 9. Lower shell 230 is formed to include a canister outlet 213 in fluid communication with the atmosphere 219. Cover 232 is formed to include a canister inlet 211 in fluid communication with engine 216 and fuel tank 224. The first carbon bed 221 is received in rectangular compartments 230C1, 230C2 of the lower shell 230 and the second carbon bed 222 is received in a cylindrical compartment 230C3 of the lower shell 230.

Canister outlet 213 is illustratively embodied as an air port 240 as shown in FIGS. 8 and 9. Air port 240 is adapted to be coupled to conduit 242 to discharge cleaned vapor from canister 210 to atmosphere 219 during the tank-refueling cycle as shown in FIG. 10.

Canister inlet 211 is embodied as a fuel vapor port 36 adapted to be fluidly coupled to fuel tank 224 and a vacuum port 38 adapted to be coupled to engine 216 as shown in FIGS. 8 and 9. Fuel vapor port 36 is adapted to be coupled to conduit 227 to admit fuel vapor discharged from fuel tank 224 into canister 210 via tank vent control system 226 during a tank-refueling cycle (and sometimes during normal engine operation). Vacuum port 238 coupled to a conduit 215 leading to intake manifold 214 to apply a vacuum provided via intake manifold 214 to an interior region 231 formed in cover 232 during a canister-purge cycle.

Cover 232 in the illustrative embodiment also includes a valve-control port 245 as shown in FIGS. 8 and 9. Valve-control port 245 is adapted to be coupled to coupled to a filler neck 225 via a conduit 243 such that valve-control port 245 is open to atmosphere 219 when fuel tank closure 246 is opened by a user removing a fuel cap as suggested in FIG. 10.

First carbon bed 221 of hydrocarbon filter 223 comprises a first group of carbon granules 221A and a second group of carbon granules 221B as suggested in FIG. 9. It is within the scope of this disclosure to provide any suitable means for retaining these carbon granules in a packed arrangement in interior region 231. In the illustrative embodiment, vapor-permeable foam sheets 280 are arranged above and below each of the groups of carbon granules 221A, 221B to retain them in place. Springs 281 and force-distribution grates 283 are used to pack groups of carbon granules 221A, 221B within the lower shell 230. Springs 282 are illustratively compression springs arranged between cover 232 and distribution grates 283.

Second carbon bed 222 of hydrocarbon filter 223 comprises a second group of carbon granules 222A as suggested in FIG. 9. It is within the scope of this disclosure to provide any suitable means for retaining the carbon granules in a packed arrangement in lower shell 232. In the illustrative embodiment, vapor-permeable felt disks 284 are arranged above and below group of carbon granules 222A to retain them in place. A compression spring 285 and a force-distribution grate 286 are used to pack group of carbon granules 222A within the lower shell 230. Spring 285 is illustratively a compression spring arranged between a bypass valve 50 included in vapor flow controller 17 and force-distribution grate 286.

Vapor flow controller 217 illustratively includes a bypass valve 250, a bleed orifice 260, and a one-way check valve 270 that cooperate to control the movement of fuel vapor through the canister 210 as shown in FIGS. 10-12. Bypass valve 250 is illustratively configured to be opened when fuel tank closure 246 is opened during tank refueling so that most of the fuel vapor vented from fuel tank 224 moves through first carbon bed 221 but not through second carbon bed 222 along a first flow path. Accordingly, second carbon bed 222 remains relatively clean to store hydrocarbons from fuel vapor vented during daily (diurnal) expansion of fuel/fuel vapor as suggested in FIG. 10. Bleed orifice 260 is sized to allow pressurized fuel vapor vented from fuel tank 224 to move from first carbon bed 221 to second carbon bed 222 along a second flow path when bypass valve 240 is closed so that vapor discharged during daily (diurnal) expansion of fuel/fuel vapor is filtered by both first and second carbon beds 221, 222 as suggested in FIG. 11. Because bleed orifice 260 is always open, some nominal amount of flow through orifice 260 between the first and second carbon beds 221, 222 occurs during refueling and during purging. One-way check valve 270 allows flow from second carbon bed 222 to first carbon bed 221 along a third flow path during purging when vacuum provided by intake manifold 214 pulls atmospheric air through canister 210 as suggested in FIG. 12.

Bypass valve 250 is illustratively a flow-controlled valve arranged in cover 232 of canister 210 as shown in FIGS. 9 and 10. Bypass valve 240 of the illustrative embodiment includes a diaphragm seat 252, a flexible diaphragm 254 that divides a valve volume 253 into a lower portion 255 and an upper portion 256, and an outlet tube 258 as shown in FIGS. 9 and 9A. Diaphragm seat 252 that cooperates with a valve cup 292 formed by the cover 232 to define internal valve volume 253 and supports flexible diaphragm 254 within internal valve volume 253. Flexible diaphragm 254 moves within valve volume 253 to block or allow a relatively large flow of fuel vapor from moving through valve volume 253 into outlet tube bypassing second carbon bed 222. Outlet tube 258 extends coaxially through second carbon bed 222 and is selectively opened to or closed off from internal valve volume 253 by flexible diaphragm 254.

Diaphragm seat 252 is a one-piece, monolithic component formed to include a divider disk 290, a mount flange 291, and a bypass tube 292 as shown in FIG. 9A. Divider disk 290 separates internal valve volume 253 from cylindrical compartment 230C3 formed by the lower shell 230 which holds second carbon bed 222. Mount flange 291 extends upwardly from divider disk 290 into internal valve volume 253 and supports flexible diaphragm 254 within internal valve volume 253. Mount flange 291 is formed to include windows 257 that allow vapor moving out of first bed 221 into internal valve volume 253 as shown In FIGS. 9A and 10. Bypass tube 292 extends upwardly from divider disk 290 into internal valve volume 253 and is fluidly connected to outlet tube 258. Flexible diaphragm 254 flexes to block or allow fluid communication into bypass tube 292 from internal valve volume 253.

A control tube 259 extends from valve cup 292 formed by cover 232 as shown in FIGS. 8 and 9. Control tube 259 provides fluid communication between upper portion 256 of valve volume 253 and filler neck 225 so that upper portion 256 of valve volume 253 is open to atmosphere 219 when fuel tank closure 246 is opened as suggested in FIG. 10. Flexible diaphragm 254 is biased toward a first position closing off bypass tube 292 from valve volume 253 by a spring 294 and spring plate 295 but may be moved to a second position opening up bypass tube 292 when control tube 259 is open to atmosphere 219.

Bypass valve 250 moves from being normally closed to open when (1) fuel tank closure 246 is opened by a user removing a fuel cap and (2) pressure in fuel tank 224 is pressure in the atmosphere 219 as shown in FIGS. 10 and 10A. A first side 254A of flexible diaphragm 254 is exposed to pressure from fuel tank 224 and normally engages outlet tube 258 to block fuel vapor from moving into outlet tube 258 and bypassing second carbon bed 222. A second side 254B of the flexible diaphragm, opposite the first side 254B, is exposed to pressure from fuel tank 224 when fuel tank closure 46 is closed and is exposed to pressure from atmosphere 219 when the fuel tank closure 46 is opened by a user removing a fuel cap. When fuel tank 224 pressure is greater than atmospheric pressure and the fuel tank closure is opened, as is typical during refueling, flexible diaphragm 254 bends out of engagement with outlet tube 258 to allow fuel vapor to move into outlet tube 258 and bypassing second carbon bed 222.

During refueling, bypass valve 250 is moved to an opened position in response to opening of fuel tank closure 246 and while pressure in fuel tank 224 is greater than atmospheric pressure as suggested by fuel tank pressure 224P in FIGS. 10 and 10A. Particularly, when fuel tank closure 246 is opened, upper portion 256 of valve volume 253 is exposed to atmospheric pressure via valve-control port 245 and control tube 259 as suggested in FIG. 10. Further, lower portion 255 of valve volume 253 is exposed to greater than atmospheric pressure via windows 257. The pressure difference between upper portion 256 and lower portion 255 of valve volume 253 causes flexible diaphragm 254 to bend toward upper portion 256 and the second position at which time outlet tube 258 is open to conduct fuel vapor from first carbon bed 221 moving through windows 257 to atmosphere 219 as shown in FIG. 10.

Bleed orifice 260 is illustratively formed in divider disk 290 of diaphragm seat 252 and provides fluid communication between first carbon bed 221 and second carbon bed 222 as shown in FIGS. 12 and 12A. During normal operation of fuel system 212, when fuel tank closure 246 is closed, bypass valve 250 is closed and fuel vapor exiting fuel tank 224 moves from first carbon bed 221 through bleed orifice 260 into second carbon bed 222 and then to atmosphere 219 along the second flow path. Accordingly, vapor discharged during normal operation is double cleaned in both first and second carbon beds 221, 222 and carries very few (if any) hydrocarbons into the atmosphere.

One-way check valve 270 is adapted to allow atmospheric air and fuel vapor to be pulled through second carbon bed 222 and first carbon bed 221 into intake manifold 214 and engine 216 along the third flow path during purging of canister 210 as suggested in FIGS. 11 and 11A. In the illustrative embodiment, one-way check valve 270 illustratively includes umbrella valves 272 as shown in FIG. 9A. Each umbrella valve 272 includes a conical diaphragm 275 coupled to a stem 274 as shown in FIG. 9A. Conical diaphragm 275 opens toward divider disk 290 of diaphragm seat 252 and is adapted to block or allow flow through purge holes 276 formed in divider disk 290. Particularly, during purging, atmospheric air and fuel vapor being pulled through second carbon bed 222 from atmosphere 219 by vacuum pressure 216P from running engine 216 acts upon conical diaphragm 275 through purge holes 276 causing conical diaphragm 275 to flex away from divider disk 290 and allow flow through purge holes 276 as suggested in FIGS. 12 and 12A.

In illustrative embodiments, the vapor flow controller 217 in the canister 210 controls the path of the fuel vapors moving through the canister 210. During refueling, the diaphragm 254 of the bypass valve 250 is open with the fuel cap off such that the fuel tank closure 246 is opened. This allows the fuel vapor during refueling to go through the first carbon bed 221 and exit the canister 210 without loading the second (last) carbon bed 222.

In illustrative embodiments, when the fuel cap is on and the fuel tank closure 246 is closed, the bypass valve 250 is in the closed position and allows the purge to pull the fresh air into the canister 210 cleaning the second carbon bed 222 and going to the first carbon bed 221 to further clean through the umbrella valves 272 as shown in FIG. 11.

In illustrative embodiments, when the bypass valve 250 is closed and the purge is not running, the second carbon bed 222 is closed and only small amount of vapor will enter the second carbon bed 222 which is very clean and will lower the amount exiting the canister 210 during the daily (diurnal) heating of the fuel in the fuel tank 224 which leads to expansion and venting of fuel vapor.

In illustrative embodiments, the vapor flow controller 217 enables two operational modes for the canister 210. In the first, refueling mode, the second carbon bed 222 is isolated from refueling loading. In the second, normal-operation mode, all fuel vapor is directed through both the first carbon bed 221 and the second carbon bed 222. The second carbon bed 222 is always purged during engine operation to prepare for the next fuel vent event.

The invention claimed is:

1. A fuel vapor recovery canister adapted for use in a vehicle fuel system, the fuel vapor recovery canister comprising a filter bed housing formed to include an interior region, a canister inlet opening into an upstream portion of the interior region, and a canister outlet opening into a downstream portion of the interior region and communicating with atmosphere, a hydrocarbon filter located in the interior region of the filter bed housing, the hydrocarbon filter including a first carbon bed positioned to lie in fluid communication with any pressurized fuel vapor and vacuum extant in the upstream portion of the interior region and a second carbon bed positioned to lie in fluid communication with any atmosphere extant in the downstream portion of the interior region and in spaced-apart relation to the first carbon bed, and a vapor flow controller configured to direct flow of at least some fuel vapor moving through the fuel vapor recovery canister from the first carbon bed to pass along a first flow path to atmosphere without passing through the second carbon bed during refueling of a vehicle fuel system associated with the fuel vapor recovery canister so that the second carbon bed remains substantially clean for use during normal operation of the vehicle fuel system and for directing the movement of fuel vapor from the first carbon bed to pass along a second flow path to atmosphere after passing through the second carbon bed during normal operation of the vehicle fuel system so that hydrocarbons suspended in fuel vapor passing through the fuel vapor recovery canister can be adsorbed by carbon in the second carbon bed and removed from vapor discharged from the fuel vapor recovery canister during normal operation the vehicle fuel system providing a low level of hydrocarbon discharge to atmosphere during normal operation, wherein the vapor flow controller includes a bypass valve configured to move from a normally closed position to an opened position in response to (i) a fuel tank closure associated with the fuel vapor recovery canister being opened by a user removing a fuel cap and (ii) pressure in a fuel tank associated with the fuel vapor recovery canister being above atmospheric pressure.

2. The fuel vapor recovery canister of claim 1, wherein the bypass valve includes an outlet tube and a flexible diaphragm, the outlet tube is arranged to provide fluid communication between the first carbon bed and atmosphere without passing through the second carbon bed, and the flexible diaphragm is bendable from a first position arranged to block movement of fuel vapor from the first carbon bed into the outlet tube to a second position arranged to allow movement of fuel vapor from the first carbon bed into the outlet tube so that fuel vapor from the first carbon bed is directed to flow through the second carbon bed before being discharged to atmosphere.

3. The fuel vapor recovery canister of claim 2, wherein the bypass valve includes a spring arranged to bias the flexible diaphragm toward the first position arranged to block movement of fuel vapor from the first carbon bed into the outlet tube.

4. The fuel vapor recovery canister of claim 2, wherein the flexible diaphragm has a first side and a second side opposite the first side, the first side of the flexible diaphragm arranged to be exposed to pressure from a fuel tank associated with the fuel vapor recovery canister and to engage the outlet tube to block fuel vapor from moving into the outlet tube and bypass the second carbon bed, the second side of the flexible diaphragm is arranged to be exposed to pressure from the fuel tank associated with the fuel vapor recovery canister when a fuel tank closure associated with the fuel vapor recovery canister is closed and is arranged to be is exposed to atmospheric pressure when the fuel tank closure associated with the fuel vapor recovery canister is opened so that when fuel tank pressure is greater than atmospheric pressure and the fuel tank closure associated with the fuel vapor recovery canister is opened the flexible diaphragm bends to the opened position out of engagement with the outlet tube to allow fuel vapor to move into the outlet tube and bypass the second carbon bed to atmosphere.

5. The fuel vapor recovery canister of claim 1, wherein the vapor flow controller includes a bleed orifice formed in a wall separating the first carbon bed from the second carbon bed to provide a vapor flow passageway that couples the first carbon bed and the second carbon bed for fluid communication to allow fuel vapor to move from the first carbon bed along the second flow path to the second carbon bed and then to atmosphere.

6. The fuel vapor recovery canister of claim 5, wherein the vapor flow controller includes a one-way check valve configured to allow flow of atmospheric air along a third flow path from the second carbon bed to the first carbon bed so that atmospheric air drawn into the fuel vapor recover canister picks up hydrocarbons adsorbed by the second carbon bed and the first carbon bed purging the second carbon bed and the first carbon bed of hydrocarbons.

7. The fuel vapor recovery canister of claim 6, wherein the one-way check valve includes an umbrella valve configured to open and close purge holes formed in the wall separating the first carbon bed and the second carbon bed.

8. A fuel vapor recovery canister adapted for use in a vehicle fuel system, the fuel vapor recovery canister comprising a filter bed housing formed to include an interior region, a canister inlet opening into an upstream portion of the interior region, and a canister outlet opening into a downstream portion of the interior region and communicating with atmosphere, a hydrocarbon filter located in the interior region of the filter bed housing, the hydrocarbon filter including a first carbon bed positioned to lie in fluid communication with any pressurized fuel vapor and vacuum extant in the upstream portion of the interior region and a second carbon bed positioned to lie in fluid communication with any atmosphere extant in the downstream portion of the interior region and in spaced-apart relation to the first carbon bed, and a vapor flow controller configured to direct flow of at least some fuel vapor moving through the fuel vapor recovery canister from the first carbon bed to pass along a first flow path to atmosphere without passing through the second carbon bed during refueling of a vehicle fuel system associated with the fuel vapor recovery canister so that the second carbon bed remains substantially clean for use during normal operation of the vehicle fuel system and for directing the movement of fuel vapor from the first carbon bed to pass along a second flow path to atmosphere after passing through the second carbon bed during normal operation of the vehicle fuel system so that hydrocarbons suspended in fuel vapor passing through the fuel vapor recovery canister can be adsorbed by carbon in the second carbon bed and removed from vapor discharged from the fuel vapor recovery canister during normal operation the vehicle fuel system providing a low level of hydrocarbon discharge to atmosphere during normal operation, wherein the vapor flow controller includes a bleed orifice providing a vapor flow passageway interconnecting the first carbon bed and the second carbon bed to allow fuel vapor from the first carbon bed to pass along the second flow path to atmosphere after passing through the second carbon bed both during normal operation of the vehicle fuel system associated with the fuel vapor recovery canister and during refueling of the vehicle fuel system associated with the fuel vapor recovery canister.

9. The fuel vapor recovery canister of claim 8, wherein the vapor flow controller includes a bypass valve configured to move from a normally closed position to an opened position when a fuel tank closure associated with the fuel vapor recovery canister is opened and pressure in a fuel tank associated with the vapor flow controller is greater than atmospheric pressure.

10. The fuel vapor recovery canister of claim 9, wherein the bypass valve includes an outlet tube and a flexible diaphragm, the outlet tube is arranged to provide fluid communication between the first carbon bed and atmosphere without passing through the second carbon bed, and the flexible diaphragm is bendable from a first position arranged to block movement of fuel vapor from the first carbon bed into the outlet tube to a second position arranged to allow movement of fuel vapor from the first carbon bed into the outlet tube so that fuel vapor from the first carbon bed is directed to flow through the second carbon bed before being discharged to atmosphere.

11. The fuel vapor recovery canister of claim 1, wherein the filter bed housing includes a lower shell and a cover coupled to the lower shell to enclose the interior region, the lower shell is formed to include the canister outlet, and the cover is formed to include the canister inlet.

12. The fuel vapor recovery canister of claim 11, wherein the lower shell is formed to include a plurality of compartments that receive the first carbon bed and the second carbon bed.

13. The fuel vapor recovery canister of claim 11, wherein the bypass valve includes a diaphragm seat that cooperates with the cover to define a valve volume, a flexible diaphragm that divides the valve volume into a lower portion and an upper portion, and an outlet tube in fluid communication with the lower portion of the valve volume that provides a passageway for fuel vapor flowing from the first carbon bed toward the second carbon bed to pass directly to atmosphere without passing through the second carbon bed and the flexible diaphragm is movable within the valve volume to engage and close off or disengage and open the outlet tube.

14. The fuel vapor recovery canister of claim 13, wherein the cover is formed to include a valve-control port opening into the upper portion of the valve volume, the valve-control port adapted to be fluidly coupled a fuel tank filler neck associated with the fuel vapor recovery canister such that upper portion of the valve volume is open to atmosphere when a fuel tank closure associated with the fuel vapor recovery canister is opened by a user removing a fuel cap.

15. A fuel vapor recovery canister comprising
a filter bed housing formed to include an interior region, a canister inlet opening into an upstream portion of the interior region, and a canister outlet opening into a downstream portion of the interior region and communicating with atmosphere,
a hydrocarbon filter located in the interior region of the filter bed housing, the hydrocarbon filter including a first carbon bed positioned to lie in fluid communication with any pressurized fuel vapor and vacuum extant in the upstream portion of the interior region and a second carbon bed positioned to lie in fluid communication with any atmosphere extant in the downstream portion of the interior region, and
a bypass valve arranged to block or allow flow of fuel vapor moving from the first carbon bed toward the second carbon bed directly to atmosphere without interacting with the second carbon bed, the bypass valve configured to move from a normally closed position to an opened position in response to opening of a fuel tank closure associated with the fuel vapor recovery canister by a user removing a fuel cap only when pressure in the fuel tank is above atmospheric pressure so that fuel vapor moving from the first carbon bed toward the second carbon bed is allowed to bypass the second carbon bed and to move to atmosphere directly keeping the second carbon bed clean for interaction with fuel vapor flowing through the fuel vapor recovery canister during normal operation of a vehicle fuel system associated with the fuel vapor recovery canister.

16. The fuel vapor recovery canister of claim 15, wherein the bypass valve includes an outlet tube and a flexible diaphragm, the outlet tube is arranged to provide fluid communication between the first carbon bed and atmosphere without passing through the second carbon bed, and the flexible diaphragm is bendable from a first position arranged to block movement of fuel vapor from the first carbon bed into the outlet tube to a second position arranged to allow movement of fuel vapor from the first carbon bed into the outlet tube so that fuel vapor from the first carbon bed is directed to flow through the second carbon bed before being discharged to atmosphere.

17. The fuel vapor recovery canister of claim 16, wherein the bypass valve includes a spring arranged to bias the flexible diaphragm toward the first position arranged to block movement of fuel vapor from the first carbon bed into the outlet tube.

18. A fuel vapor recovery canister comprising
a filter bed housing formed to include an interior region, a canister inlet opening into an upstream portion of the interior region, and a canister outlet opening into a downstream portion of the interior region and communicating with atmosphere,
a hydrocarbon filter located in the interior region of the filter bed housing, the hydrocarbon filter including a first carbon bed positioned to lie in fluid communication with any pressurized fuel vapor and vacuum extant in the upstream portion of the interior region and a second carbon bed positioned to lie in fluid communication with any atmosphere extant in the downstream portion of the interior region, and
a bypass valve arranged to block or allow flow of fuel vapor moving from the first carbon bed toward the second carbon bed directly to atmosphere without interacting with the second carbon bed, the bypass valve configured to move from a normally closed position to an opened position in response to opening of a fuel tank closure associated with the fuel vapor recovery canister by a user removing a fuel cap when pressure in the fuel tank is above atmospheric pressure so that fuel vapor moving from the first carbon bed toward the second carbon bed is allowed to bypass the second carbon bed and to move to atmosphere directly keeping the second carbon bed clean for interaction with fuel vapor flowing through the fuel vapor recovery canister during normal operation of a vehicle fuel system associated with the fuel vapor recovery canister, wherein the bypass valve includes an outlet tube and a flexible diaphragm, the outlet tube is arranged to provide fluid communication between the first carbon bed and atmosphere without passing through the second carbon bed, and the flexible diaphragm is bendable from a first position arranged to block movement of fuel vapor from the first carbon bed into the outlet tube to a second position arranged to allow movement of fuel vapor from the first carbon bed into the outlet tube so that fuel vapor from the first carbon bed is directed to flow through the second carbon bed before being discharged to atmosphere, and wherein the flexible diaphragm has a first side and a second side opposite the first side, the first side of the flexible diaphragm arranged to be exposed to pressure from a fuel tank associated with the fuel vapor recovery canister and to engage the outlet tube to block fuel vapor from moving into the outlet tube and bypass the second carbon bed, the second side of the flexible diaphragm is arranged to be exposed to pressure from the fuel tank associated with the fuel vapor recovery canister when a fuel tank closure associated with the fuel vapor recovery canister is closed and is arranged to be is exposed to atmospheric pressure when the fuel tank closure associated with the fuel vapor recovery canister is opened so that when fuel tank pressure is greater than atmospheric pressure and the fuel tank closure associated with the fuel vapor recovery canister is opened the flexible diaphragm bends to the opened position out of engagement with the outlet tube to allow fuel vapor to move into the outlet tube and bypass the second carbon bed to atmosphere.

19. A fuel vapor recovery canister comprising
a filter bed housing formed to include an interior region, a canister inlet opening into an upstream portion of the interior region, and a canister outlet opening into a downstream portion of the interior region and communicating with atmosphere,
a hydrocarbon filter located in the interior region of the filter bed housing, the hydrocarbon filter including a first carbon bed positioned to lie in fluid communication with any pressurized fuel vapor and vacuum extant in the upstream portion of the interior region and a second carbon bed positioned to lie in fluid communication with any atmosphere extant in the downstream portion of the interior region,
a bypass valve arranged to block or allow flow of fuel vapor moving from the first carbon bed toward the second carbon bed directly to atmosphere without interacting with the second carbon bed, the bypass valve configured to move from a normally closed position to an opened position in response to opening of a fuel tank closure associated with the fuel vapor recovery canister by a user removing a fuel cap when pressure in the fuel tank is above atmospheric pressure so that fuel vapor moving from the first carbon bed toward the second carbon bed is allowed to bypass the second carbon bed and to move to atmosphere directly keeping the second carbon bed clean for interaction with fuel vapor flowing through the fuel vapor recovery canister during normal operation of a vehicle fuel system associated with the fuel vapor recovery canister, and
a bleed orifice formed in a wall separating the first carbon bed from the second carbon bed to provide a vapor flow passageway interconnecting the first carbon bed and the second carbon bed to allow fuel vapor to move from the first carbon bed both when the bypass valve is closed and opened.

20. A fuel vapor recovery canister comprising
a filter bed housing formed to include an interior region, a canister inlet opening into an upstream portion of the interior region, and a canister outlet opening into a downstream portion of the interior region and communicating with atmosphere,
a hydrocarbon filter located in the interior region of the filter bed housing, the hydrocarbon filter including a first carbon bed positioned to lie in fluid communication with any pressurized fuel vapor and vacuum extant in the upstream portion of the interior region and a second carbon bed positioned to lie in fluid communication with any atmosphere extant in the downstream portion of the interior region, and
a bypass valve arranged to block or allow flow of fuel vapor moving from the first carbon bed toward the second carbon bed directly to atmosphere without interacting with the second carbon bed, the bypass valve configured to move from a normally closed position to an opened position in response to opening of a fuel tank closure associated with the fuel vapor recovery canister by a user removing a fuel cap when pressure in the fuel tank is above atmospheric pressure so that fuel vapor moving from the first carbon bed toward the second carbon bed is allowed to bypass the second carbon bed and to move to atmosphere directly keeping the second carbon bed clean for interaction with fuel vapor flowing through the fuel vapor recovery canister during normal operation of a vehicle fuel system associated with the fuel vapor recovery canister, wherein the bypass valve includes a one-way check valve configured to allow flow of atmospheric air from the second carbon bed to the first carbon bed.

21. The fuel vapor recovery canister of claim 20, wherein the one-way check valve includes an umbrella valve configured to open when atmospheric air flows from the second carbon bed toward the first carbon bed.

* * * * *